United States Patent [19]

Hoy et al.

[11] Patent Number: 4,659,772

[45] Date of Patent: Apr. 21, 1987

[54] NOVEL POLYMER/POLYOLS AND USES THEREOF

[75] Inventors: Kenneth L. Hoy, St. Albans; Glenn A. Taylor, S. Charleston, both of W. Va.

[73] Assignee: Union Carbide Corporation, Danbury, Conn.

[21] Appl. No.: 808,260

[22] Filed: Dec. 12, 1985

Related U.S. Application Data

[62] Division of Ser. No. 536,315, Sep. 27, 1983, Pat. No. 4,581,470.

[51] Int. Cl.$^4$ ............................................. C08L 25/12
[52] U.S. Cl. .................... 524/755; 524/757; 524/759; 524/760; 524/761; 524/762
[58] Field of Search ............... 524/755, 757, 759, 760, 524/761, 762

[56] References Cited

U.S. PATENT DOCUMENTS

| | | | |
|---|---|---|---|
| Re. 28,715 | 2/1976 | Stamberger | 521/137 |
| Re. 29,118 | 1/1977 | Stamberger | 521/137 |
| 1,922,459 | 8/1933 | Schmidt et al. | 521/175 |
| 2,174,762 | 10/1939 | Schuette et al. | 521/137 |
| 2,450,079 | 9/1948 | Brown | 521/137 |
| 2,527,970 | 10/1950 | Sokol | 521/137 |
| 2,629,740 | 2/1953 | Carnes | 260/453 |
| 2,657,181 | 10/1953 | Van Horn et al. | 260/453 |
| 2,768,141 | 10/1956 | Langer et al. | 528/49 |
| 3,005,776 | 10/1961 | Langer | 528/49 |
| 3,022,335 | 2/1962 | Lundsted | 521/137 |
| 3,036,130 | 5/1962 | Jackson et al. | 544/177 |
| 3,073,788 | 1/1963 | Hostettler et al. | 521/175 |
| 3,325,421 | 6/1967 | Muller et al. | 252/308 |
| 3,331,791 | 7/1967 | Cuscurida | 564/505 |
| 3,384,653 | 5/1968 | Erner et al. | 260/453 SP |
| 3,391,196 | 7/1968 | Earing et al. | 568/624 |
| 3,394,164 | 7/1968 | McClellan et al. | 260/453 SP |
| 3,457,200 | 7/1969 | Critchfield et al. | 521/159 |
| 3,461,086 | 8/1969 | Mogford et al. | 521/174 |
| 3,535,307 | 10/1970 | Moss et al. | 536/18.3 |
| 3,644,457 | 2/1972 | Konig et al. | 260/453 SP |
| 3,706,714 | 12/1972 | Lloyd | 528/76 |
| 3,883,571 | 5/1975 | Allport et al. | 260/453 AM |
| 4,045,474 | 8/1977 | Taller et al. | 560/126 |
| 4,061,684 | 12/1977 | Helfert et al. | 568/613 |
| 4,144,395 | 3/1979 | Murphy et al. | 560/200 |
| 4,208,314 | 6/1980 | Priest et al. | 524/762 |
| 4,226,756 | 10/1980 | Critchfield et al. | 524/388 |

FOREIGN PATENT DOCUMENTS

| | | |
|---|---|---|
| 43966 | 1/1982 | European Pat. Off. |
| 0043966 | 6/1981 | Fed. Rep. of Germany |
| 867461 | 5/1961 | United Kingdom |
| 1042833 | 9/1966 | United Kingdom |
| 1217005 | 12/1970 | United Kingdom |

OTHER PUBLICATIONS

*Rubber Age*, 7, 46 (1975).

Primary Examiner—Maurice J. Welsh
Attorney, Agent, or Firm—Paul W. Leuzzi

[57] ABSTRACT

Novel polyols, useful in, for example, reaction injection molding, high resiliency foams and the preparation of polymer/polyols, characterized by the following formula:

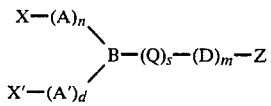

wherein A and A', which may be the same or different, are connective atoms—carbon, oxygen or combinations thereof with hydrogen atoms or the like satisfying the valences; B is nitrogen (N) or CR, R being hydrogen, alkyl, aryl or the like; Q is O, $CH_2O$, $C_2H_4O$, $C_3H_6O$, or $C_4H_8O$; D is an oxyalkylene or

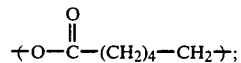

X and X', which may be the same or different, are OH, $NH_2$ or H; Z is OH; n and d are integers of 0 to 10 and the sum of n and d does not exceed 10; s is 0 or 1, and m is an integer of at least about 16, with the proviso that when B is N and either n or d is zero, X and X' are other than H, provide processing advantages and are highly compatible with low molecular weight extenders such as ethylene glycol.

12 Claims, No Drawings

NOVEL POLYMER/POLYOLS AND USES THEREOF

This application is a division of prior U.S. application: Ser. No. 536,315 filed 9/27/83 and now U.S. Pat. No. 4,581,470.

BACKGROUND OF THE INVENTION

1. Field Of The Invention

This invention relates to novel polymer/polyols and to the use of such polyols in preparing polyurethanes.

2. Description Of The Prior Art

As is known, the molecular architecture of polyurethanes for many applications, such as, for example, reaction injection molding (commonly termed "RIM") is based upon a distribution of hard and soft segments. The RIM technique is described in *Rubber Age*, Volume 7, page 46, 1975. The hard segments (i.e., the reaction product of the isocyanate and low molecular weight extenders) provide the modulus requirements, while the soft segments (i.e., the polyol) provide the resiliency or flexibility characteristics. The respective materials or monomers employed contain the reactive moieties at the extreme ends of the molecule. Upon reaction, the molecules are linked end-to-end in a chain fashion.

These polyurethanes are thus block polymers, consisting of the alternating hard and soft segments. The soft segments, most typically polyether polyols, have low glass transition temperatures ($T_g$), while the hard segments are usually short chain diol or diamine polyurethane or polyureas having a relatively high $T_g$ or $T_m$. The block character of the polymer causes the hard and soft segments to phase separate into domains. The domain morphology accounts for the advantageous performance properties of such polyurethanes. Thus, when there are at least two hard segments per molecule, a tough elastomeric structure is formed in which the hard domains act as, in effect, bound filler particles that in a sense crosslink and reinforce the soft elastomeric segments.

The domains can be formed by a deliberate step growth polymerization process. However, in many urethane materials, such as in the RIM technique previously described, this domain morphology is formed in situ during the polymerization by a physical chemical phase separation process.

The phase separation process is promoted during the polymerization by the growth of the hard segment molecular weight, increase in the macroglycol molecular weight (i.e., the molecular weight of the polyol and the isocyanate) and the basic incompatability of the hard and soft segments (viz.—the difference in the cohesive energy density). When incomplete phase separation results, what may be termed a "mixed phase" results. The net effect of the presence of a mixed phase is to adversely affect the useful service temperature range of the polyurethane. Thus, an excessive amount of mixed phase increases the room temperature modulus; but, at higher temperatures (e.g., 60° to 80° C.), the mixed phase passes through its glass transition and then behaves as a poor elastomer resulting in a dramatic loss of stiffness and strength. Likewise, at low temperature conditions, problems with brittleness can occur. Annealing the polyurethane can increase the amount of the crystalline hard phase; but the annealing process is time consuming and may cause other undesirable side effects such as, for example, warpage, cracking and the like.

The phase separation process is affected by thermodynamic as well as kinetic factors. Less than satisfactory kinetic control can cause excessive incompatibility between the hard and soft segments. The resulting material in such a situation contains fewer covalent bonds between hard and soft segments, producing a material having poor integrity and what may be termed a "cheese-like" appearance. Premature phase separation can also occur due to inadequate initial thermodynamic factors.

Providing adequate control of the various reaction and process parameters becomes substantially more difficult in conventional RIM processes when high modulus polyurethanes are desired or required. At high hard segment contents, i.e., high modulus formulations, it appears that the phase separation occurs later in the polymerization reaction. The low soft segment concentrations and the viscosity of the reaction mixture at phase separation together with the rigidity of the hard segment polymer seem to kinetically restrict phase separation. In effect, it thus appears that the potential burying of the reactive groups in the crystalline hard segment early in the polymerization process is most likely the cause for this inhibition. The resulting polyurethanes may well fail to exhibit the necessary flexural moduli at various use temperatures. The impact strength, while adequate for fascia parts, is commonly insufficient to provide the properties required for true high performance engineering plastics useful for forming structural parts. Commercial usage of RIM techniques have, for this reason, been generally limited to forming nonstructural parts (i.e., nonload-bearing) such as fascia for the automotive market.

A further problem is that some of the potential applications for polyurethane elastomers would require the use of substantial amounts of low molecular weight chain extenders to achieve the necessary physical properties. The use of ethylene glycol as the extender is highly desirable since the resulting modulus enhancement is superior in comparison to that achieved with higher molecular weight extenders. Unfortunately, ethylene glycol is not compatible in satisfactory amounts with conventional polypropylene oxide-based polyols. Although incompatibility can be tolerated to some extent, the processing problems and limitations created are significant. As one example, bulk shipments and/or storage for even short periods of time become economically unfeasible due to the resulting phase separation of the polyol and chain extender. Even in use, processing often requires continual mixing to prevent phase separation. For this reason, users have often resorted to the use of butanediol which obviates the compatibility problem; but this result sacrifices modulus enhancement (in comparison to the use of ethylene glycol).

One approach to solving these several problems is set forth in U.S. Pat. No. 4,226,756 to Critchfield et al. Satisfactory compatibility and modulus enhancement are provided by utilizing polymer/polyols formed using poly(oxypropylene-oxyethylene) polyols of high ethylene oxide content. The distribution of ethylene oxide in the polyol as well as the amount thereof are essential in providing elastomers with the desired properties. Conceptually, a portion of the ethylene oxide is present as a cap; and the remainder is distributed internally in the polyol chain. Such polyols can tolerate incompatible amounts of ethylene glycol and the like without creating processing problems because the resulting mixture exhibits self-emulsifying properties. The ethylene oxide content of the polyols may be up to 50% and perhaps even more. This approach, however, results in an increase in the amount of ethylene glycol that is solubilized in comparison to the amount which is solubilized when conventional polyoxypropylene polyols are used.

In addition to the previously described techniques, for RIM and other applications, the introduction of hard segments into polyurethanes has been carried out by including in the formulation materials commonly termed polymer/polyols. Polymer/polyols have been described in various prior patents, including U.S. Pat. Nos. Re. 28,715 and 29,118 to Stamberger.

A further and significant application for polyurethanes is in making high resiliency foams, often termed "HR" foam. In this application, rapid reactivity is required for adequate processing. As is known, this necessitates that the polyols utilized possess a relatively high percentage of primary hydroxyl groups since the reactivity of an isocyanato radical with a primary hydroxyl is considerably faster than is the case with a secondary hydroxyl group. The utilization of ethylene oxide in polyoxypropylene polyols can be used to increase the percentage of primary hydroxyl groups. However, this improvement in reactivity may well be at the expense of undesirable adverse performance characteristics. More specifically, due to the typical relatively high surface area of HR foams, the inclusion in the polyol of significant amounts of ethylene oxide may well have adverse effects on the desired humid aging properties of the foam.

Great Britain Patent No. 1,042,833 describes oxyalkylated derivatives of glycerol which have a large percentage of primary hydroxyl groups. These compounds are prepared by reacting an alkylene oxide and ethylidene glycerol in the presence of a basic catalyst and thereafter hydrolyzing to provide the polyol.

European Patent Application EP No. 43,966, filed Jan. 20, 1982, describes the alkoxylation of compounds such as 2,2-dimethyl-1,3-dioxolane-4-methanol with oxirane or the like. The alkoxylate is treated with an alkyl isocyanate or an acid chloride to block the terminal OH group and is then treated with an acid to cleave the dioxolane ring, giving a surfactant containing two hydroxyl groups derived from the cleaved ring.

U.S. Pat. No. 2,629,740 to Carnes describes the preparation of polyether amines, i.e., hydrolyzable N-substituted polyether amines. A plural-carbon aldehyde or ketone such as acetaldehyde and an alkoyl amine such as ethanolamine are reacted to provide a 2-substituted oxazolidine. The oxazolidine is then reacted with a compound such as ethylene oxide, glycidol or the like. It is stated that it appears the epoxy compound adds at the nitrogen atom of the oxazolidine ring, and that a fairly large number of moles of epoxy compound (up to 100) may be so added, creating in effect a polyether side chain terminating in hydroxyl. The compound remaining is hydrolyzed with water, whereby the original aldehyde or the like and the polyether secondary amine are formed. These compounds are disclosed as being valuable as intermediates, particularly in the synthesis of surface active agents and for other purposes.

Despite the prior efforts, there continues to be the need to provide a polyurethane system capable of adequately satisfying the many diverse requirements of RIM techniques and extending potential end uses without suffering any penalties insofar as performance and the like are concerned. Still further, when using polymer/polyols to form at least a portion of the hard phase, it would be desirable to minimize or eliminate the mixed phase which results when using conventional polyols in the polymer/polyol preparation. The need exists to provide polyols having adequate reactivity for HR foam applications, yet which achieve the necessary processing characteristics without adversely affecting the foam characteristics desired.

OBJECTS OF THE INVENTION

It is a principal object of the present invention to provide polyols capable of imparting improved properties in a wide variety of urethane processes and applications.

It is a further object of this invention to provide polyols capable of satisfying the many diverse requirements of RIM applications.

Another object provides polyols which are less sensitive to RIM process parameters so that satisfactory processing latitude can be widened.

Yet another object of this invention is to provide polyols capable of use in forming polyurethanes exhibiting superior modulus characteristics.

Another object lies in the provision of polyols for preparing polymer/polyols characterized by improving phase separation when polyurethanes are formed.

A still further object of the present invention is to provide polyols having superior emulsion stability characteristics for low molecular weight extenders without causing any increase in the amount of solubilization of such extenders.

Another object of this invention is to provide polyols having adequate reactivity to allow use in HR foams without adversely affecting the desired foam characteristics.

Other objects and advantages of the present invention will become apparent from the following detailed description.

SUMMARY OF THE INVENTION

This invention relates to polyols having a composite molecular architecture in which end of the molecule, in effect, mimics the cohesive energy and glass transition and melting point characteristics of low molecular weight extenders used in RIM processing, while the remainder of the molecule is similar in structure to a conventional polyol. The novel polyols of the present invention may be characterized by the following formula:

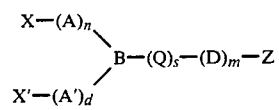

wherein A and A', which may be the same, or different, are connective atoms—carbon, oxygen or combinations thereof with hydrogen atoms or the like satisfying the valences; B is nitrogen (N) or CR, R being hydrogen, alkyl, aryl or the like; Q is O, $CH_2O$, $C_2H_4O$, $C_3H_6O$, $C_4H_8O$; D is an oxyalkylene or

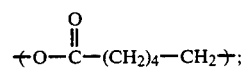

X and X', which may be the same or different, are OH, NHR or H, R being as previously defined; Z is OH; n and d are integers of 0 to 10 and the sum of n and d does not exceed 10, s is zero or one, and m is an integer of at least about 16, with the proviso that when B is N and either n or d is zero, X and X' are other than H. These polyols possess three functional groups reactive with an isocyanate radical, viz.—a hydroxyl group, a primary amine or a secondary amine. Accordingly, either both X and X' must be selected to provide such functional groups, or the combination of X and X' and their respective adjacent atomic units both must provide such functional groups.

As will be discussed herein, the polyols of the present invention are highly versatile and are thus capable of providing improved performance in a wide variety of applications. These applications include RIM processes, HR foam preparation, and polymer/polyol preparation.

DETAILED DESCRIPTION OF THE INVENTION AND PREFERRED EMBODIMENTS

Polyol Preparation

In general, the polyols of the present invention may be prepared by selecting a suitable trifunctional starter or a precursor capable of being converted to a trifunctional material, blocking two of the functional groups (unnecessary when a precursor is employed), alkoxylating or extending by alternate polymerization techniques the remaining functional group and then unblocking the blocked groups or, in the case of a precursor, converting the structure to provide the desired functional groups.

Regarding the starter, any trifunctional material may be utilized in which at least two of the functional groups are located within from 2 to about 11 atomic units from each other. In the case of a starter precursor, this is satisfied when the precursor after alkoxylation can be converted to provide two functional groups within the atomic unit range set forth. One end of the polyols of the present invention has properties mimicing the low molecular weight extenders employed in RIM processes. It is for this reason that the location set forth for at least two of the functional groups is necessitated. Moreover, the extender end structure provides significant benefits in properties in applications where hard segments are made, as will be discussed more fully hereinafter in conjunction with such applications.

Accordingly, when used in RIM applications, the upper limit for the location of such functional groups is a relative one, based upon the fact that the low molecular weight extenders normally used will have no more than about 10 carbon atoms, typically probably less than about 6 or so. More specifically, it appears to be generally desirable to utilize a starter in which the atomic unit separation of at least two of the functional groups closely approximates the atomic spacing of the hydroxyl groups of the low molecular weight extender being employed. As one example, when 1,4-butanediol is employed as a low molecular weight extender, it is preferred to utilize a starter in which at least two of the functional groups are located in the range of about 3 to 5 atomic units from each other.

The selection of the particular starter will also involve consideration of the ease (when necessary) with which blocking may be accomplished as well as the ability to unblock the functional groups, following completion of the alkoxylation or other polymerization step. It is thus preferred to utilize starters in which the blocking and unblocking steps may be carried out in a fashion such that both functional groups in virtually every starter molecule may be simultaneously blocked and then readily unblocked. Stated in another way, it is desired to use a starter which is capable of being converted to a polyol having a consistent chemical structure. More preferably, it is desirable to utilize a trimethylolalkane since all three hydroxyl groups are equivalent. This insures that a consistent chemical structure is obtained regardless of which two groups are blocked.

Exemplary chemistry for carrying out the formation of the polyols of the present invention wherein the atomic spacing between adjacent functional groups is varied within the range previously set forth is described hereinafter. It should be appreciated that other synthetic routes can certainly be utilized. The 1,2 through 1,11 polyols of this invention may thus be made using an appropriate starting material selected from the following (starting materials (A), (B) and (E) are starters that have already been blocked; materials (C), (D) and (F) are precursors):

Solketal; 2,2-dimethyl-4-hydroxymethyl-1,3-dioxolane: (A)

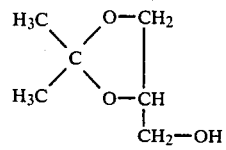

isopropylidene trimethylolpropane; 2,2-dimethyl-5-hydroxymethyl-1,3-dioxolane: (B)

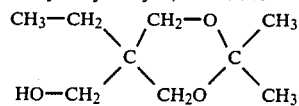

3-dihydro-2H—furfuryl-2-methanol: (C)

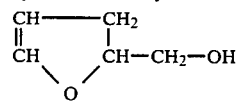

3,4-dihydro-2H—pyran-2-methanol: (D)

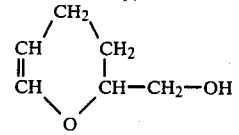

2-isopropylorayolidineethanol: (E)

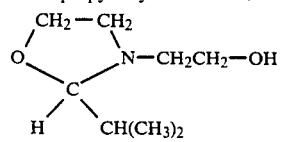

polyglycol-substituted ethanolamines: (F)

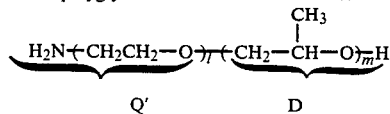

These starting materials are either commercially available and/or their synthesis is known.

The appropriate starting material is alkoxylated to the desired hydroxyl number (i.e., molecular weight); and the resulting alkoxylated intermediate is hydrolyzed, preferably under acidic conditions (e.g., 1% sulfuric acid). The aldehyde or ketone by-product formed may be removed by distillation at either atmospheric or reduced pressure. In the case of starting materials (A) and (B), this results in the formation, respectively, of the 1,2- and 1,3- specie.

The use of starting materials (C) and (D) produce an aldehyde moiety upon hydrolysis. These may then be reduced to primary alcohols, e.g., by using sodium borohydride. The use of starting material (C) results in the 1,4- species; and the utilization of starting material (D) provides the 1,5- species.

After hydrolysis, when starting material (E) has been employed, the addition of a monomer such as acrolein and subsequent reduction to the alcohol produces the 1,6- species.

The 1,7- through 1,11- specie may be prepared using either starting material (F) or starting materials (A)–(D). The addition of acrolein to either starting material (F) or the hydrolyzed intermediate formed using starting materials (A)–(D), followed by reduction of the aldehyde functional group (e.g., by using sodium borohydride), will provide the 1,7 - to 1,11 - species, as will be set forth below.

The reaction conditions used for the steps in the syntheses previously described are known. Set forth below are the exemplary reaction pathways leading to the various specie:

1,2-Derivative

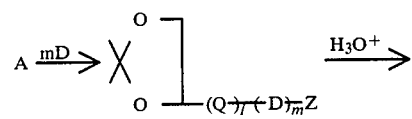

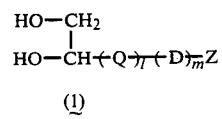

(1)

1,3-Derivative

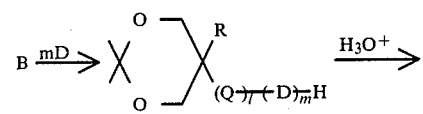

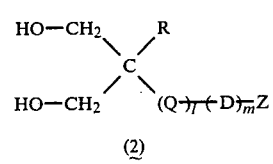

(2)

1,4-Derivative

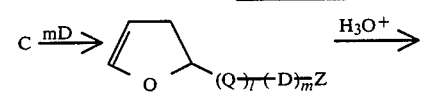

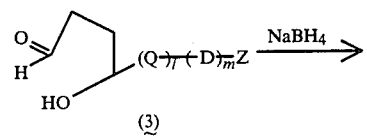

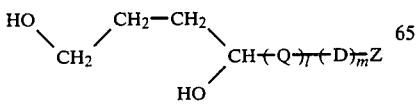

-continued
1,5-Derivative

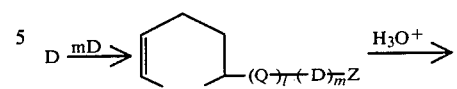

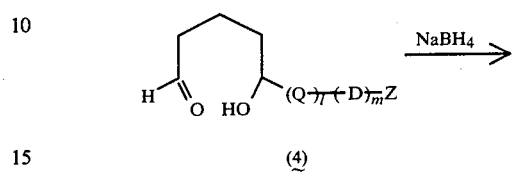

(4)

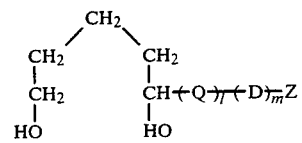

1,6-Derivative

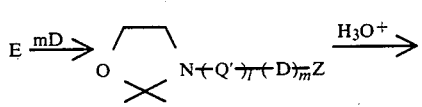

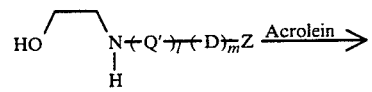

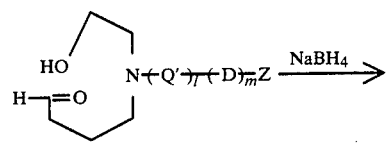

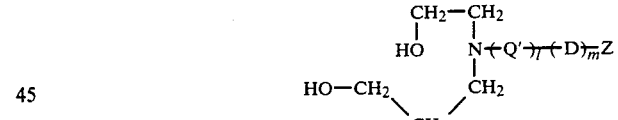

1,7-Derivative

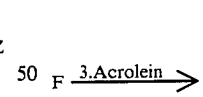

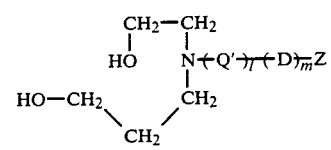

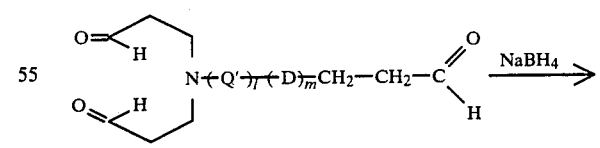

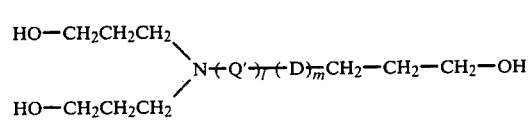

1,8-Derivative

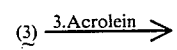

-continued

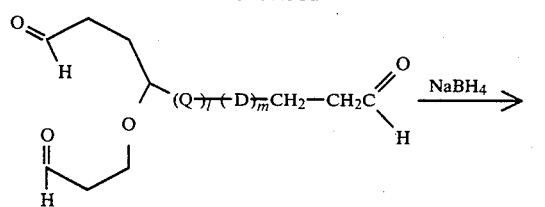

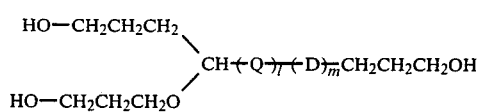

1,9-Derivative (4) $\xrightarrow{\text{3.Acrolein}}$

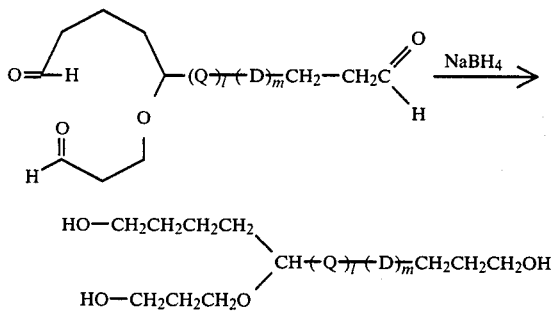

1,10-Derivative (1) $\xrightarrow{\text{3.Acrolein}}$

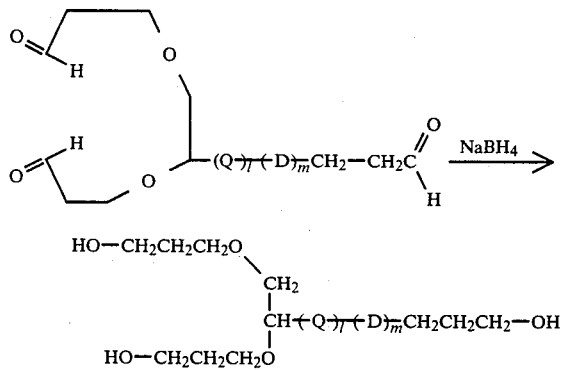

1,11-Derivative (2) $\xrightarrow{\text{3.Acrolein}}$

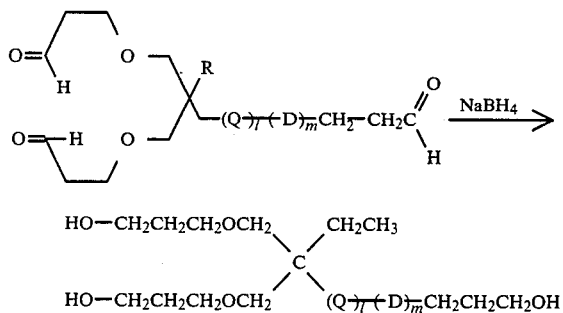

In the above exemplary syntheses of the polyols of the present invention, Q, Q', R, D and Z are members selected from the groups defined above in connection with the formula for such polyols. More specifically in these syntheses, Q is —CH$_2$—O—, Q' is —CH$_2$CH$_2$O—, R is —CH$_2$CH$_3$, D is oxypropylene, and Z is OH. As noted above m is an integer of at least about 16, and in these syntheses may be any such integer, corresponding to the desired number of moles of propylene oxide.

It is particularly preferred to utilize as a starter the isopropylidene derivative of trimethylolpropane (referred to herein as "ITMP"). In terms of the polyol formula previously set forth, in the polyol which results when ITMP is used B is CR wherein R is C$_2$H$_5$, A and A' are CH$_2$, X and X' are OH, and n and d are each 1. This results in polyols in which the hydroxyl groups at the extender end of the molecule are spaced 3 atomic units apart and are also primary hydroxyls, so as to enhance the reactivity with isocyanato radicals. Moreover, polyols derived from ITMP may be prepared in a facile synthesis, offering wide processing latitude with a clean, consistent chemical structure being provided.

Blocking two of the hydroxyl groups may be accomplished by conventional techniques such as, for example, either acetal or benzyl ether formation. It is preferred, however, to utilize a conventional ketalization reaction using acetone since, if desired, the acetone used for blocking may be regenerated for potential recycle, thereby reducing processing costs.

As is known, propoxylation as is carried out in forming conventional polyols inherently results in a side reaction. This side reaction involves a propylene oxide rearrangment which results in a relatively low molecular weight unsaturated monol impurity. The magnitude of this impurity tends to increase as the molecular weight (i.e., low hydroxyl number) to which the polyol is being built is increased.

In the present invention, to provide the desired molecular weight to achieve the necessary performance characteristics for typical polyurethane applications, generally determined by the hydroxyl number desired, it is necessary to drive the propoxylation reaction further than would be involved in conventional polyol formulation. For example, and keeping in mind that two of the functional groups are either blocked or have not been converted to the appropriate group, the polyoxypropylene chain must be built, when desired to provide a hydroxyl number of 30 for the ultimate polyol, to a molecule having a hydroxyl number of about 10. Upon hydrolysis or other steps to form the other two functional groups, the hydroxyl number will be essentially tripled.

When driving the reaction to this extent, it has been found that the presence of excessive amounts of the unsaturated monol impurity that often result when conventional propoxylation techniques are used may dissipate the benefits desired for certain applications that would otherwise be provided by using the polyols of this invention. For such applications, it is accordingly preferred to carry out the propoxylation reaction in such a fashion as to minimize the propylene oxide rearrangement reaction. To this end, it has been found suitable to carry out the propoxylation at relatively low temperatures, using a rate-assistance agent or a more effective catalyst than is typically used. It is thus preferred to carry out the propoxylation reaction at a temperature lower than about 65° C. or so, utilizing either a conventional Crown ether rate assistance agent, e.g., 18-Crown-6, or a more effective catalyst than potassium hydroxide, such as, for example, zinc hexacyanocobaltate.

The extent of the propyleneoxylation reaction will, in general, be determined by the hydroxyl number desired for the particular application, as has been alluded to herein. In general, the polyols of the present invention will typically have a hydroxyl number in the range of from about 25 to about 150. Polyols having hydroxyl numbers in such range may be employed for preparing polymer/polyols. Either RIM processing or forming HR foam will typically utilize, for example, a polyol of the present invention having a hydroxyl number in the range of from about 30 to about 75.

When the polyols of the present invention are employed in applications where hard segments are made, the oxypropylene chain of such polyols should be sufficiently long to insure that the desired clean phase separation (i.e., minimal mixed phase) results in forming the polyurethane product. In addition to the molecular weight effect, providing clean phase separation should also take into account the cohesive energy density effects. It is thus the proper balance of these effects which will result in clean phase separation taking place. Accordingly, in applications where the cohesive energy density differential of the components cannot be adequately adjusted, as for example in RIM processes, it will be the molecular weight effect that must be adjusted to provide the desired clean phase separation. For such applications, it will accordingly be desirable to have a relatively long oxyalkylene chain, a minimum of at least 35 units being suitable. The chain length may extend up to about 60 to 72 or so, and viscosity considerations may dictate the upper desired limit for the chain length. In other applications where the cohesive energy density effect may be more readily adjusted to provide the desired clean phase separation, the oxyalkylene chain length becomes less critical. For these applications, a minimum chain length of about 16 units or so should be satisfactory.

The oxypropylene chain may be, as is known, capped with ethylene oxide to increase the percentage of primary hydroxyls in the polyol molecules for those applications, such as RIM and HR foams, where optimum reactivity is required. Suitable capping may typically involve the incorporation of up to about 5 to 16% weight percent of ethylene oxide or so. Typically, capping is carried out by adding about five ethylene oxide units for each free hydroxyl group which should result in capping about 80% or so of such hydroxyl groups. In situations where the starter molecule provides two primary hydroxyl groups in the extender end of the molecule, such as is the case with ITMP as the starter, ethylene oxide capping can increase the percentage of primary hydroxyl groups up to about 90% or so in the resulting polyol.

To provide the characteristics desired for most polyurethane applications, it will generally be desirable to minimize the amount of ethylene oxide due to the potential adverse effects upon properties such as humid aging which are involved when ethylene oxide is incorporated into the polyol. However, ethylene oxide can be incorporated up to the level where excessive adverse effects upon the desired polyurethane product result. Accordingly, as used herein, the term "polyoxypropylene" or the like, is intended to include, unless otherwise indicated, polyoxypropylene chains in which a tolerable level of internal ethylene oxide may be incorporated.

One aspect of the polyols of the present invention which may prove significant for many applications is the relatively high actual functionality. Thus, as is known, the preparation of conventional polyoxypropylene polyols, nominally considered as triols, generally result in an actual functionality in the 2.6–2.7 range. In sharp contrast, the actual functionalities of the polyols of this invention, also nominally trifunctional, are on the order of 2.9 or so.

Polymer/Polyol Preparation

To provide further modulus enhancement for particular polyurethane applications, it may be useful to utilize the polyols of the present invention to form polymer/polyols to incorporate into the polyurethane formulation. As is known, polymer/polyols may be prepared by polymerizing the ethylenically unsaturated monomer or monomers desired in situ in the polyols of the present invention.

Any ethylenically unsaturated monomer may be used, and useful monomers are described in various prior patents, including U.S. Pat. Nos. Re. 28,715 and 29,118 to Stamberger. Acrylonitrile, with or without a comonomer or comonomers, such as, for example, styrene, will provide a suitable system. The particular monomer system employed will be dependent upon the product characteristics desired in the resulting polyurethane product.

The polymer content of the polymer/polyol may vary within wide limits, again depending upon the requirements of the end use application. Thus, satisfactory property enhancement may be achieved using as little as about 5% by weight or so. On the other hand, it may be necessary or desirable to utilize polymer contents as large as can be employed to make a stable product, in which case the polymer content may well be up to 50% or even higher.

It should also be appreciated that the polymer/polyol may be blended with any desired polyol, suitable polyols being described in the above-identified Stamberger patents, including the polyols of the present invention, to reduce the polymer content to the required level for the particular application. Typical base polyols will generally have a hydroxyl number in the range of from about 25 to about 150, depending upon the particular application. Indeed, blending will generally be preferred when relatively low amounts of polymer content (e.g., about 10% or less) are needed due to the economic penalty involved in forming polymer/polyols with such relatively low polymer content initially. It should, however, be appreciated that the polyol used for blending will effect the compatibility and the phase separation that results; and it will therefore be desirable to select the polyol with this in mind. More particularly, the use of conventional poly (oxypropylene) polyols may well result in unsatisfactorily high amounts of mixed phase being formed, such polyols in effect diluting the hard phase content that would otherwise be formed. The utilization of the polyols of this invention do not result in this dilution effect and are accordingly preferred when it is desired to minimize the mixed phase content.

The techniques for preparing polymer/polyols are well known, and any known technique may be employed. The polymer/polyols of the present invention may thus be produced by utilizing the process set forth in U.S. Pat. No. 4,208,314 to Priest et al. In accordance with that process, a low monomer-to-polyol ratio is maintained throughout the reaction mixture during the process. This is achieved by employing process conditions that provide rapid conversion of monomer to polymer. In practice, a low monomer-to-polyol ratio is maintained, in the case of semi-batch and continuous operation, by control of the temperature and mixing conditions, and, in the case of semi-batch operation, also by slowly adding the monomers to the polyol.

The temperature range is not critical and may vary from about 25° C. to about 140° C. or perhaps greater. The temperature should be selected so that the catalyst has a reasonable rate of decomposition with respect to the hold-up time in the reactor for a continuous flow reactor or the feed time for a semi-batch reactor.

The mixing conditions employed are those attained using a back mixed reactor (e.g., a stirred flask or stirred autoclave). Reactors of this type keep the reaction mixture relatively homogeneous and so prevent localized high monomer-to-polyol ratios such as occur in certain tubular reactors, (e.g., the first stages of "Marco" reactors when such reactors are operated with all the monomer added to the first stage).

Polyurethane Preparation

The polyurethanes of the present invention may be produced by reacting: (a) a polyol, a polymer/polyol composition or a polyurea dispersion in a polyol (in accordance with the present invention), (b) an organic polyisocyanate and (c) a catalyst for the reaction of (a) and (b) to produce the polyurethane. Optionally, for processes such as RIM, a low molecular weight chain extender will also be employed.

The organic polyisocyanates that are useful in producing polyurethanes in accordance with this invention are organic compounds that contain at least two isocyanato groups. Such compounds are well known in the art of producing polyurethanes. Suitable organic polyisocyanates include the hydrocarbon diisocyanates, (e.g., the alkylene diisocyanates and the arylene diisocyanates) as well as known triisocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, (1,10-diisocyanatopropyl)ether of 1,4-butylene glycol, 1,11-diisocyanatoundecane, 1,12-diisocyanatododecane, bis(isocyanatohexyl) sulfide, 1,4-diisocyanatobenzene, 2,4-diisocyanatotolylene, 2,6-diisocyanatotolylene, 2,4-diisocyanato-1-chlorobenzene, 2,4-diisocyanato-1-nitrobenzene, and 2,5-diisocyanato-l-nitrobenzene and mixtures thereof. Still other useful examples include 4,4'-diphenylmethane diisocyanate, 1,5-naphthalene diisocyanate, isophorone diisocyanate (IPDI) and 1,4-xylene diisocyanate. Yet additional useful examples are the modified liquid MDI-type isocyanates described in U.S. Pat. No. 3,384,653 and various quasi-prepolymers as described in the following U.S. Pat. Nos.: 3,394,164; 3,644,457; 3,457,200 and 3,883,571.

The catalysts that are useful in producing polyurethanes in accordance with this invention include: (a) tertiary amines such as bis(dimethylaminoethyl)ether, trimethylamine, triethylamine, N-methylmorpholine, N-ethylmorpholine, N,N-dimethylbenzylamine, N-N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine bis-acetylacetone-alkylene-diimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2{++}$, $UO_2{++}$, and the like; (f) alcoholates and phenolates of various metals such as Ti(OR)$_4$, Sn(OR)$_4$, Sn(OR)$_2$, Al(OR)$_3$, and the like, wherein R is alkyl or aryl, and the reaction products of alcoholates with carboxylic acids, betadiketones, and 2(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivaties of tetravalent tin, trivalent and pentavalent As, Sb, and Bi, and metal carbonyls of iron and cobalt.

Among the organotin compounds that deserve particular mention are dialykltin salts of carboxylic acids, e.g. dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Dialkyltin mercaptides may also be utilized. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis (2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

If desired, other additional ingredients can be employed in minor amounts in producing the polyurethanes in accordance with the process of this invention. Illustrative of such additives that can be employed are: fillers, dyes, pigments, anti-oxidation agents, silicone surfactants, and the like. Indeed, in accordance with yet another aspect of the present invention, the use of filled elastomers may be employed to yield extremely hard elastomers. Thus, for example, where a particular end use application requires a relatively high Shore D hardness, rather than utilizing excessive amounts of chain extender, the formulation could include suitable amounts of any conventional modulus-enhancing filler material to yield an elastomer with that hardness.

Also, some applications require a blown rather than a solid elastomer. Thus, some applications might find a density of 20 pounds per cubic foot or even less desirable. In such instances, blown elastomers can be produced by conventional techniques. This may be thus accomplished by employing a small amount of a polyurethane blowing agent, such as water, in the reaction mixture, or through the use of blowing agents which are vaporized by the exotherm of the reaction or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1, 2,2-trifluoromethane, hexafluorocyclobutane, octafluorocyclobutane, and the like. Another class of blowing agents include thermally unstable compounds which liberate gases upon heating, such as N,N'-dimethyl-N, N'-dinitrosoterephthalamide, amine formates and the like. The quantity of blowing agent employed will vary with factors such as the density desired in the foamed product.

If a surfactant is employed, a minor amount in the range of up to about 5 parts by weight per 100 parts by weight of the polymer/polyol reactant will typically be satisfactory. The use of a surfactant may be desired, for example, to enhance the development of a more uniform cell size. Any organosilicone or silicone-free, organic surfactant may be utilized.

RIM Applications

In general, the process comprises mixing the various components of the formulation together, injecting the mixed components under pressure into the mold cavity heated to a temperature selected to provide the desired reactivity and then removing (often termed "demolding") the molded product (i.e., plaque) from the cavity. The residence period in the mold, i.e., the demolding time, is selected such that the plaque has developed adequate green strength to allow removal without distortion of the plaque or the like resulting. Typical demolding times are 60 seconds or so, with improvements in productivity resulting when shorter demolding times can be employed while still achieving a tolerable reaection rate. The various process parameters are known.

Typically, the components of the formulation are fed into the mixing chambers in two streams. One stream comprises the polyol, the extender diol and the catalyst, while the other stream comprises the diisocyanate of choice. Other optional ingredients, such as a blowing agent to aid in insuring that the mold cavity is filled or reinforcing aids such as glass fiber or the like, can also be included, generally being added with the polyol feed stream.

The particular components that may be used in the formulation are known and are generally selected on the basis of the reactivity desired and the particular performance requirements for the end use application. Useful components have also been previously described. It is generally desirable to utilize a diisocyanate that will yield an optimum (typically high) crystalline phase, i.e.—as high a $T_m$ as possible, consistent with the reactivity desired. For these reasons, MDI or blends of MDI with other diisocyanates are often the choice. The polyol constituent will generally have a hydroxyl number in the range of from about 30 to about 60 or up to 75 or so.

Any of the known low molecular weight chain extenders may be utilized in forming the polyurethanes. As has been referred to herein, conventional glycol extenders ranging from ethylene glycol up to glycols having 10 carbon atoms span the typical molecular weight range utilized. In addition to ethylene glycol, other representative glycol extenders sometimes employed as chain extenders include the following: 1,4-butanediol; 1,6-hexanediol; 1,5-pentanediol; 1,3-propanediol and diethylene glycol. In addition, other types of low molecular weight chain extenders such as low molecular weight alkanolamines may be used. As examples, N-(2-hydroxyethyl)piperazine and monoethanolamine may be utilized.

Because of the apparent high compatibility of the polyols of the present invention for such low molecular weight extenders, the present invention in some respects provides greater utility when chain extenders are employed which are not compatible in acceptable amounts with state of the art technology. However, it should be appreciated that the invention is equally applicable to use with chain extenders which are already satisfactorily compatible such as, for example, diamine extenders.

The amount of the chain extender employed will, of course, vary over a wide range, depending upon the physical property requirements for the particular end use application. This is typically determined by reference to the percent hard phase desired. Based upon the weight of the polyol of the present invention and that of the extender, ethylene glycol in an amount of about 21% should provide a hard phase content of about 58% (assuming clean phase separation, viz.—there is essentially no mixed phase), basically the maximum achievable limit with existing technology. Achieving a hard phase content of about 62% (assuming again clean phase separation) should require about 24% ethylene glycol. Using about 24% butanediol should provide a hard phase content of 58%. Most applications where the RIM process has been used employ a hard phase, as a minimum, of about 40%. The use of ethylene glycol in an amount of about 11% should achieve that level. Stated differently, for most applications with ethylene glycol, the weight percent utilized will vary from about 10 to about 25%. This range, when other extenders are used, will increase somewhat with increasing molecular weight of the extender being used.

Whether it is desirable or necessary to include an amount of polymer/polyol or other modulus-enhancing material in the formulation depends upon the modulus desired. Thus, utilizing the novel polyols of the present invention should allow a higher extent of hard segment to be employed while still achieving the desired clean phase separation in the polyurethane reaction. However, there is an upper practical limit beyond which additional extender cannot be practically employed. At this limit, the harder segments will form so fast that the polyol molecules will, in effect, get lost and will not enter into reaction with the isocyanate material used. This will result in a layer-like structure of hard segments and polyol segments which can be separated one from the other.

When utilizing the novel polyols of the present invention, clean phase separation should be capable of being obtained when the hard segment content is up to about 60%, or even perhaps 65%. Beyond this range, further modulus enhancement will need to be achieved by including suitable amounts of polymer/polyols or other modulus-enhancing agents.

As is known, and previously referred to herein, the utilization of ethylene glycol as the extender, the lowest molecular weight material possible for this purpose, will impart to the resulting polyurethane the flattest modulus curve possible (in a modulus vs. temperature plot, the modulus varies the least over the temperature range). Utilization of ethylene glycol in conventional formulations has been limited to some extent due to the relatively low amounts which are compatible in the systems. Using the polyols of the present invention, however, ethylene glycol in an amount of up to about 40% or so based upon the weight of the polyol and extender can be utilized while still yielding a satisfactorily compatible system. This level is well above the amount needed to maximize the hard phase content achievable just with extender when using presently existing RIM technology. Importantly, this compatibility is achieved without any increase in solubilization occurring that would result in increased mixed phase being formed.

Utilization of the polyols of this invention also offer what are considered to be significant processing advantages. Thus, formulations using the novel polyols tend to provide less sensitivity insofar as process parameters such as the NCO Index are concerned while still resulting in satisfactory processing characteristics. To this end, the NCO Index may range from about 95 to about 110, preferably about 100 to about 104, more preferably 100 to 102. It is preferred to utilize a slight excess of the diisocyanate since under these conditions the mixed phase level tends to be minimized and some modulus enhancement is provided. What is significant is that the utilization of the polyols of the present invention allows the RIM process to be carried out over a wide NCO Index range. This is in marked contrast to the use of conventional polyols which often require operation under starved diisocyanate conditions simply to provide a satisfactorily consistent molding operation. Demolding times of 15 seconds or perhaps even less should thus be capable of being attained without sacrifice in further processing or in the resulting properties of the polyurethane. The green strength of the molded product, due to the clean phase separation that results, should be increased, resulting in easier subsequent handling and the like. Post-curing of unsatisfactorily low strength molded products requires considerable labor and handling due to the necessity of supporting the product during the post-curing operation. This is minimized in accordance with the present invention not only due to the relatively high green strength of the molded products, but also due to the concomitant fact that the properties of the molded product are sufficiently developed so that there is essentially no change in the hard phase content even after post-curing has been carried out.

A further desirable and significant advantage of the use of the present polyols when employed in RIM applications is the more controlled rheological pathway (in comparison to conventional polyols) leading to the formation of the final plaque. It has thus been found that the increase in viscosity which develops due to the buildup of the cross-link network occurs relatively later in the reaction than is the case using conventional polyols. This allows the mold cavity to be more readily filled when using the present polyols, which should translate to a reduced rate of rejection of the resulting plaques. The results thus demonstrate that the use of the polyols of the present invention allow longer processing time at moderate viscosities than occurs when using conventional polyols. Gels times at equivalent hydroxyl numbers should be essentially the same. This difference in the interim rheology is believed to contribute to the ability of the polyols of this invention to process satisfactorily over a wide NCO Index range.

From the standpoint of the designer of the polyurethane product, it would be ideal to have an essentially constant modulus. This would insure consistent performance characteristics over a wide range of temperatures. Practically speaking, this is extremely difficult to achieve. Accordingly, depending upon the particular requirements of the molded part, a particular operating modulus range can be tolerated. However, this workable modulus range is locked in; and, to the extent that it comprises the entire operable or workable range, the molds utilized to form the product will be relatively complex. The ability to achieve narrower modulus differentials over a wide temperature range should allow the utilization of molds of simpler construction which should desirably translate to a reduced rejection rate for the product being molded, thereby increasing the unit production and decreasing the unit cost.

In accordance with one feature of the present invention, it has been found that the modulus for polyurethane products molded utilizing the novel polyols of the present invention tends to be more constant than that of products molded using conventional polyols. This is believed due to the relatively cleaner phase separation which can be achieved using the novel polyols of this invention.

Moreover, it would be desirable to provide a molded product having a relatively wide service temperature range, i.e., the operable lower limit being determined as the minimum temperature at which the soft segment is an amorphous elastomer so that the product will not shatter or the like upon impact, while the upper temperature limit is the maximum temperature at which the crystalline hard phase will not melt. It would accordingly be desirable to provide a product capable of withstanding the temperatures typically achieved in automobile paint shop operations which may be as high as 300° F. Indeed, capability to withstand temperatures up to about 250° F. or so would allow many painting operations involved in automobile production to be more efficiently carried out, viz.—being done in an on-line situation as opposed to being done offline or in a manual operation. It is believed that products made using the novel polyols of this invention formulated for this purpose should be capable of satisfying this objective.

In short, in RIM and other applications, the polyols of this invention may be considered to be friendly polyols in that use of such polyols tends to be forgiving, allowing substantially more latitude and requiring less exactness in the various molding process parameters than is often the case with conventional polyols.

HR Foam Applications

The preparation of HR foam is well known and involves free rise, water-blown techniques. Water is employed to generate the carbon dioxide and amines to increase the percentage of hard polymer segments to provide the desired resiliency. A polyol having high reactivity is required since the polyol must adequately compete with the amines for reaction with the diisocyanates to prevent foam collapse. In other words, the polyol must have entered into the reaction by the time the rise height is reached so that the foam will gel and retain its blown configuration without collapse.

While this application requires extremely high reactivity, the resulting foam has a relatively high surface area making humid aging properties a potential problem. This problem may be particularly acute when the reactivity required is achieved by utilizing a relatively large amount of ethylene oxide in the polyol. The use of the polyols of the present invention achieve the high reactivity needed with a minimum amount of ethylene oxide being employed.

Caprolactones

For some applications, it may be desirable to utilize polyols having other than an oxypropylene polymer chain. For example, in electrocoating and for thermoplastic elastomers where superior low temperature properties are desired, a caprolactone-based chain should be desirable. These may be prepared in accordance with known technology to provide such polyols within the formulas previously set forth.

EXAMPLES

The following Examples are illustrative of, but not in limitation of, the present invention. These Examples describe the preparation of the novel polyols of the present invention, the use of such polyols in RIM applications, and the preparation of high resiliency polyurethane foams using such polyols.

DEFINITIONS

As used in the Examples appearing below, the following designations, symbols, terms, and abbreviations have the indicated meanings:

Polyol I denotes a product made by reacting propylene oxide and ethylene oxide successively with glycerol in the presence of potassium hydroxide catalyst and refining to remove catalyst. The product contains 15 wt % ethylene oxide and has a nominal hydroxyl number of 35.5.

Polyol II denotes a product made similarly to Polyol I, except that the glycerol starter is dehydrated under vacuum before propylene oxide is added. The product has a nominal hydroxyl number of 29.5.

Polyol III denotes a product made by reacting propylene oxide and a 40/60 mixture of ethylene oxide and propylene oxide with glycerol in the presence of potassium hydroxide catalyst and refining to remove the catalyst. The product is capped with 15 wt % ethylene oxide and has a nominal hydroxyl number of 28.

Polyol IV denotes a product made by reacting propylene oxide and ethylene oxide successively with glycerine in the presence of potassium hydroxide and then refining to remove the catalyst. The resulting product has a nominal hydroxyl number of 28 and an ethylene oxide content of 13.5 wt %.

Polyol V denotes a product made similarly to Polyol I except that it contains 16.5 wt % ethylene glycol and has a nominal hydroxyl number of 35.

Polyol VI denotes a product made similarly to Polyol I except that it contains 15 wt % ethylene oxide and has a nominal hydroxyl number of 27.5.

Polymer/polyol A denotes a polymer/polyol having 21 wt % total solids and a ratio of 52:48 acrylonitrile:styrene. The polyol is Polyol I.

BDO denotes 1,4-butanediol.

"Unsat (meq/g)" denotes the unsaturation level of the polyol or polymer/polyol in millequivalents per gram.

POLYOL PREPARATION

The novel polyols of the present invention (hereinafter referred to as, for example, 1,2-extender polyol etc.) described in the Examples which follow were prepared, unless otherwise indicated, by a two-step process. In the first step, a polyol precursor, or triol starter derivative, was prepared by reacting the desired starter with a blocking agent to block the functional groups of the starter and thus to prevent undesired reactions of the starter functional groups, i.e., extender segment of the starter, during a subsequent alkoxylation reaction. The blocked triol starter derivative was then alkoxylated with the desired alkylene oxide to form a product having a long alkylene oxide chain segment and a blocked extender segment. The product was treated with an aqueous acidic solution to unblock the functional groups of the extender segment. The unblocked product was then purified to recover polyol. The specific process parameters for each reaction step are set forth below.

A. PREPARATION OF THE BLOCKED STARTER

The blocked starter was prepared by reacting a 1:1 molar ratio of the desired starter with acetone in an excess of toluene (preferably in a ratio of solvent-to-reactants of at least 1.8) in the presence of 0.1 wt % p-toluene sulfonic acid catalyst. The reaction was carried out at atmospheric pressure at a temperature of about 85° C.

By-product water was removed as a heterogeneous azeotrope with toluene as the reaction proceeded. Upon completion of the reaction, the catalyst was neutralized with sodium acetate, and the remaining toluene solvent was removed by vacuum distillation. The starter derivative product was then distilled under vacuum from the reaction vessel and collected.

B. ALKOXYLATION OF THE BLOCKED STARTER

A starter mixture was prepared by adding to the blocked starter prepared in Part A above a solution of 0.15 wt.% (based on the final product) potassium hydroxide in ethanol, stripping off water by-product and ethanol in a flash vaporator at 100° C. under reduced pressure (0.1 mm Hg) for three hours and adding 1.5 wt.% (based on the final product) of 18-Crown-6 ether catalyst.

The starter mixture was charged to a two liter autoclave purged and pressurized with nitrogen to 20 psi. The mixture was then heated to 70°-75° C. and propylene oxide was fed to the reactor at a rate so as to maintain the temperature below 75° C. with a slow rise in pressure. Heating at 70°-75° C. continued for 1-2 hours after the propylene oxide had been fed. Sufficient propylene oxide was added to achieve the desired molecular weight of the polyol.

Optionally the alkoxylation product can be capped with ethylene oxide, if desired.

C HYDROLYSIS OF ALKOXYLATION PRODUCT

The alkoxylation product prepared in Part B above was then hydrolyzed to unblock the blocked functional groups of the extender segment of the starter and thus produce the polyol. The hydrolysis reaction was carried out using the following technique.

The alkoxylation product was hydrolyzed by adding to the product a 1% aqueous sulfuric acid solution, heating the mixture to 100° C. and refluxing. A stoichiometric amount of acetone was removed at 58° C., and water was removed under vacuum. The resultant product was then treated with 1% lime and 2% "Hi-Flow" filter aid, stirred for one hour, and filtered in a "Sparkle" filter under nitrogen pressure using No. 1 filter paper to recover the polyol product.

PREPARATION OF RIM PLAQUES

Unless otherwise indicated, hand-cast plaques were prepared according to the following procedure.

A 500 ml, 4-necked, round-bottom reaction flask equipped with a mechanical stirrer, vacuum inlet, and thermometer was charged with a mixture of extender polyol and a chain extender such as 1,4-butanediol in the desired weight ratios, and a tin catalyst, such as dibutyltin dilaurate. The flask was then degassed under reduced pressure with stirring for approximately 20 minutes. The required amount of isocyanate reagent (e.g. tolylene diisocyanate or the like) was then charged to the flask, and the contents were vigorously stirred under vacuum for at least 15 seconds. The vacuum was then broken on the reaction flask, and the liquid system was rapidly poured into a mold comprising two glass plates, one measuring 7.5"×12" and the other measuring 9"×12" spaced apart with a 0.5" wide Teflon spacer of the desired thickness and which fit the outer edge of the glass plates. The plates were coated with Hysol mold release compound. After the liquid system was poured into the mold, the mold was securely clamped around its perimeter using spring clamps and placed into an oven at 100° C. overnight. The plaques were demolded and tested for their physical properties.

PREPARATION OF HIGH RESILIENCY MOLDED FOAM

High resiliency molded polyurethane foams were prepared using a mixture of a base polyol and a polymer/polyol in the weight ratio of polyol-to-polymer/polyol of 70:30 and using 3.1 parts by weight water, optionally a fluorocarbon blowing agent in the amount of 8.0 parts by weight, if used, 0.035 parts by weight amine catalyst, 2.0 parts by weight of a stabilizing silicone surfactant, 0.015 parts by weight stannous octanoate and 34 parts by weight polyisocyanate reactant comprising tolylene diisocyanate.

The foam formulations were converted to polyurethane foams using the following procedure. The polyol, polymer/polyol, tin catalyst, amine catalyst, water and silicone surfactant were charged to a suitable container and mixed at 4000 rpm for 55 seconds. The mixture was allowed to sit for 45 seconds. (If fluorocarbon blowing agent was used, it was then added, mixing was continued for 10 seconds.) Polyisocyanate reactant was added and mixing continued for 5 seconds. The mixture was poured into a waxed aluminum mold or cake box at a mold temperature of about 120° F. The mold was clamped and allowed to stand for two minutes. The mold was then placed in a conventional oven, preheated to 250° F., for 5 to 8 minutes, then demolded.

EXAMPLES

Examples 1 and 2 illustrate the preparation of the polyols of this invention wherein the extender portion of the polyol has 1,2 functional groups, and Examples 3–7 illustrate the preparation of polyols of this invention wherein the extender portion of the polyol has 1,3 functional groups. The polyols prepared in Examples 1–5 and 7 were prepared using the method described above. The polyol prepared in Example 6 was a pilot plant scale preparation. The reactants used, amounts thereof, and product produced are identified hereinafter.

EXAMPLE 1

This Example illustrates the preparation of a polyol having a 1,2-functional group extender portion.

The blocked starter was prepared by reacting, 92 grams glycerol (as the starter) with 58 grams acetone in 209 grams toluene in the presence of 0.15 grams p-toluene sulfonic acid. The reaction produced 98 grams soketal (1,2-derivative) and 20 grams 1,3-isopropylidene derivative of glycerol.

The reaction product, 36 g, was then reacted with 681 grams propylene oxide to form the blocked extender polyol. The reaction product was capped with 31.0 grams ethylene oxide and hydrolyzed to give 695 grams of 1,2-extender polyol product of number average molecular weight of 2546 grams/mole.

EXAMPLE 2

This Example illustrates the preparation of a polyol having a 1,2-extender portion and a molecular weight higher than the polyol of Example 1.

The blocked starter was prepared by reacting 134 grams of 1,2,6-hexanetriol (as the starter) with 58 grams acetone in 346 grams toluene, in the presence of 0.19 grams p-toluene sulfonic acid. A total of 157 grams of starter derivative product was obtained.

The blocked starter, 50.5 grams, was then reacted with 1165 grams propylene oxide. The product was capped with 54.3 grams ethylene oxide and hydrolyzed to give 1190 grams of 1,2-extender polyol product of number average molecular weight of 4372 grams/mole.

EXAMPLE 3

This Example illustrates the preparation of a polyol having a 1,3-extender portion and molecular weight of 2900.

The blocked starter was prepared by reacting 134 grams of 2-ethyl-2(hydroxymethyl)-1,3-propandiol (i.e. trimethylol propane) and 58 grams acetone in 346 grams toluene in the presence of 0.19 grams p-toluene sulfonic acid. The reaction yield was 156 grams of starter product, i.e., 2,2-dimethyl-5-hydroxymethyl-1,3-dioxane.

The blocked starter was then alkoxylated with propylene oxide by reacting 51.2 grams of the starter with 766 grams of propylene oxide. The alkoxylated product was then capped with 35.3 grams ethylene oxide and hydrolyzed to give 790 grams of 1,3-extender polyol having a number average molecular weight of 2900 grams/mole.

EXAMPLE 4

A polyol having a 1,3-extender portion and a number average molecular weight of 4300 was prepared by reacting 51.2 grams of the blocked starter prepared in Example 3 with 1156 grams propylene oxide according to the alkoxylation procedure described above. The alkoxylated derivative was capped with 58.9 grams ethylene oxide and hydrolyzed to produce 1180 grams of the 1,3-extender polyol.

EXAMPLE 5

A polyol having a 1,3-extender portion and a number average molecular weight of 5210 was prepared by reacting 51.2 grams of the blocked starter prepared in Example 3 with 1390 grams of propylene oxide according to the alkoxylation procedure described above. The alkoxylated derivative was capped with 58.9 grams ethylene oxide and hydrolyzed to produce 1430 grams of the 1,3-extender polyol.

EXAMPLE 6

This Example illustrates the preparation of a pilot plant scale of 1,3-extender polyol of the present invention. The polyol had a number average molecular weight of 4500.

Isopropylidene trimethylol propane, a 1,3-blocked starter, was prepared by charging a stainless steel reactor equipped with a shrouded 3-bladed axial-flow, down-pumping impeller operating at 196 rpm with 97.2 pounds of trimethylol propane, 45.0 pounds of acetone, 258 pounds of toluene and 0.14 pounds of p-toluene sulfonic acid. The mixture was agitated and brought to reflux at atmospheric pressure through a short unpacked column. By-product water was removed as its azeotrope with toluene as the ketal reaction proceeded. The major portion (10 pounds of a total 12 pounds of water) distilled over in 4 hours. The remainder was removed in the next 12 hours.

After completion of the reaction, the product was cooled and neutralized by adding 0.13 pounds of sodium acetate. The toluene solvent was then stripped from the product at reduced pressure (300 mm Hg) through the short, unpacked column.

The final product was distilled at 96° C. at 20 mm Hg pressure. Laboratory analysis of the 93 pounds of isopropylidene trimethylolpropane indicated an acceptable purity of 99 percent.

The isopropylidene trimethylol propane was alkoxylated with propylene oxide, capped with ethylene oxide, hydrolyzed with sulfuric acid and neutralized to yield a polyol, by the following procedure.

A 30-gallon, stirred steel autoclave was charged with 34.7 pounds of the isopropylidene trimethylolpropane and 3.8 pounds of potassium hydroxide in a 50 percent aqueous solution. The temperature was raised to 110° C., and the solution was stripped for 2 hours at 2 mm Hg. After breaking the vacuum with nitrogen and cooling to 60° C., 9 pounds of 18-Crown-6 ether was added under a nitrogen blanket. The solution was then stripped for 1/2 hour at 60° C. and 5 mm Hg. After the second stripping, the reactor was put under 10 psig nitrogen pressure and 148.5 pounds of propylene oxide was then fed continuously into the reactor over an 11 hour period at an average feed rate of 13.5 pounds per hour while maintaining the temperature at 60° C. The product was cooked-out for one hour at 60° C.

The reaction product (196 pounds) was transferred to a 100-gallon, glass-lined stirred autoclave through a transfer line. A total of 681 pounds of propylene oxide was then fed to the autoclave in two parts. Initially, 667 pounds of propylene oxide were fed over a 17.5 hour period at an average feed rate of 35.8 pounds per hour. The reaction temperature was held constant (at 60° C.) for one hour, and an additional 14 pounds of propylene oxide were added over a one hour period. The product was cooked out for four hours at 58° C. The final reactor pressure, after cook-out, was 92 psig.

The reactor was vented, and a nitrogen purge of the product was maintained for one hour to strip out any unreacted propylene oxide. The vent was closed, and the pressure was adjusted with nitrogen to 5 psig. Reactor temperature was adjusted to 100° C., and 74.25 pounds of ethylene oxide were fed over a 3.7 hour period at an average feed rate of about 20 pounds per hour. The product was cooked out for 2 hours at 102° C. to a final pressure of 10 psig. The reactor was cooled to 60° C. and then neutralized to a pH of 6.3 by adding 1.6 pounds of sulfuric acid, and mixing at 60° C. for one hour. The ethylene oxide-capped, propoxylated blocked starter (crude polyol) was hydrolyzed in two essentially equal batches as follows. A reactor was charged with 451 pounds of crude polyol, 333 pounds of deionized water, 7.5 pounds of sulfuric acid and heated to 110° C. at atmospheric pressure. About 166 pounds of distillate was removed.

The product was neutralized with 17 pounds of a 50% aqueous potassium hydroxide solution, and additional distillate (about 168 pounds) was stripped off over a one hour period at 98° C. and 5 mm Hg to yield crude 1,3-extender polyol product.

The crude 1,3-extender polyol was further treated to remove salts and the like. An autoclave was charged with 897 pounds of the crude 1,3-extender polyol, 8 pounds "Magnasol" and 8 pounds "Hi-Flow" filter aid. The mixture was heated for 4 hours at 100° C. under vacuum (5 mm Hg). The mixture was then circulated through a "Sparkle" filter until a negative potassium test was achieved (about 3 hours). A total of 710 lbs. of pure 1,3-extender polyol was recovered.

The pure 1,3-extender polyol had a hydroxyl number of 38.5, a number average molecular weight of 4160, unsaturation, meq/gm of 0.026, a viscosity, at 25° C., of 1085 and a calculated functionality of 2.88. Also, by nuclear magnetic resonance spectroscopy, it was found that the polyol contained 8.6 wt. % ethylene oxide and 89.5 mole % primary hydroxyl groups.

EXAMPLE 7

This Example illustrates the preparation of isopropylidene trimethylol propane, a 1,3-extender polyol, using zinc hexacyanocobaltate, a low temperature catalyst system.

An autoclave was charged with a mixture of 25 grams tetrahydrofuran (dried over 5A molecular sieves), 52 grams of isopropylidene trimethylol propane starter (of Example 6) and 0.4 grams catalyst, i.e., zinc hexacyanocobaltate, suspended in the mixture. An additional 62 grams of tetrahydrofuran (to make up a 50% tetrahydrofuran solution based on initial weights of the reactants) were used to rinse the vessel which contained the starter mixture and were then added to the autoclave under a nitrogen purge. The reactor was purged several times with nitrogen and adjusted to 10 psig pressure. The mixture was stirred while 52 grams of propylene oxide were added, and the temperature was raised to 70° C. After about 45 minutes, the alkoxyation reaction had begun, and an additional 1101 grams of propylene oxide were fed to the reactor at a feed rate of 130 grams/hr., slightly faster than the rate of consumption, while maintaining the temperature at 70° C.

The polyol product was treated with "Magnasol", and filtered. The polyol had a hydroxyl number of 15.2, unsaturation, meq/g, less than 0.01 and a nominal number average molecular weight of 3722.

EXAMPLES 8-14

These Examples illustrate the preparation of hand-cast polyurethane plaques in accordance with the hand-cast technique described above, utilizing the 1,3-extender polyols of the present invention. The number average molecular weight of the 1,3-extender polyols varied from 2423 to 5200. In Examples 8-10, plaques were formulated with 1,4-butanediol (BDO) as the chain extender in a weight ratio of BDO-to-1,3extender polyol of 15:85. In Examples 12 and 13, the weight ratio of BDO:1,3-extender-polyol was 25:75. For comparative purposes, in Examples 11 and 14, a commercial polyol, i.e., Polyol I, was used. The weight ratios of BDO:Polyol I in these Examples were 15:85 and 25:75%, respectively.

In Examples 8-11, plaques were prepared from a 41% hard phase formulation consisting of 0.15 g dibutyltin dilaurate, 45.7 g tolyene diisocyanate (at NCO index of 104), 67.4 g polyol (identified in the Table) and 11.9 g BDO. In Examples 12-14, plaques were prepared from a 54% hard phase formulation consisting of 0.15 g dibutyltin dilaurate, 55 g tolylene diisocyanate (at NCO index of 104), 52.5 g polyol (identified in the Table) and 17.5 g BDO.

The properties of the 1,3-extender polyols (denoted in the Table as 1,3-ex) and Polyol I used in these Examples, and the properties of the hand-cast polyurethane plaques made in these Examples are set forth in Table I.

the 1,3-extender polyols of the present invention at either weight ratio of BDO: 1,3-extender polyol. Thus, the flex modulus ratio of plaques at a weight ratio of BDO:polyol of 15:85 made using the 1,3-extender polyols were, for Examples 8, 9 and 10, respectively 4.25, 3.28 and 4.27, as compared to a flex modulus ratio of 4.5 for Polyol I, and at a weight ratio of BDO:polyol of 25:75, the flex modulus ratio of plaques made using the 1,3-extender polyols is 5.3 and 3.8 (Examples 12 and 13) as compared to a flex modulus ratio of 6.6 for Polyol I (Example 14). It can further be seen that of the various molecular weight 1,3-extender polyols, the 1,3-extender polyol of molecular weight of 4574 (Examples 9 and 13) shows the most significant improvement in the flex modulus ratio as compared to the Polyol I based plaque made at either weight ratio of BDO:1,3-extender polyol.

The improved flex modulus ratio of RIM polyurethane realized with the 1,3-extender polyols of this invention should provide a substantial benefit in RIM polyurethane production. Thus, the improved flex modulus ratio can provide an increase in the usable or working modulus temperature range of RIM polyurethanes, or, in the alternative, their use can result in less risk in the design of structural parts over a given temperature range.

The crystalline transition differential ($\Delta H$) and glass transition differential ($\Delta T$) for 1,3-extender polyol based plaques also appear to be satisfactory, in general, while the $\Delta H$ and $\Delta T$ for the 4574 molecular weight

TABLE I

| Example No. | 8 | 9 | 10 | 11 | 12 | 13 | 14 |
|---|---|---|---|---|---|---|---|
| Polyol, type | 1,3-ex[1] | 1,3-ex[1] | 1,3-ex[1] | I | 1,3-ex[1] | 1,3-ex[1] | I |
| molecular wt. | 2423 | 4574 | 5200 | 4300 | 2423 | 4574 | 4300 |
| unsaturation meq/g | 0.024 | 0.030 | 0.006 | 0.084 | 0.024 | 0.030 | 0.084 |
| ethylene oxide (wt. %) | 7.0 | 5.7 | 7.5 | 14 | 7.0 | 5.7 | 14 |
| propylene oxide (moles) | 38 | 72 | 86 | 72[2] | 38 | 72 | 72[2] |
| BDO:Polyol Ratio (wt. %) | 15:85 | 15:85 | 15:85 | 15:85 | 25:75 | 25:75 | 25:75 |
| Physical Properties | | | | | | | |
| Density (pcf) | 71.6 | 71.7 | 69.7 | 71.4 | 75.2 | 73.6 | 71.2 |
| Hardness (Shore D) | 46 | 41 | 43 | 45 | 53 | 53 | — |
| 100% Modulus (psi) | 2070 | 1570 | 1650 | 1840 | 3252 | 2635 | 2767 |
| Tensile Strength (psi) | 3140 | 2933 | 2230 | 2800 | 4206 | 3439 | 3224 |
| Ult. Elong. (%) | 188 | 263 | 158 | 190 | 160 | 160 | 138 |
| Die "C" Tear (psi) | 300 | 222 | 245 | 289 | 253 | 277 | 459 |
| Flex Modules (psi) | | | | | | | |
| −29° C. | 51 | 31.5 | 32 | 36 | 108.0 | 75.9 | 87.3 |
| 24° C. | 18 | 14.6 | 13 | 12 | 32.3 | 32.6 | 27.9 |
| 70° C. | 12 | 9.6 | 7.5 | 8 | 20.4 | 20.0 | 13.6 |
| Flex Modulus Ratio | | | | | | | |
| −29° C./70° C. | 4.25 | 3.28 | 4.27 | 4.5 | 5.3 | 3.8 | 6.6 |
| Sag (1 in.) 1 hr., 121° C. | 0.15 | 0.2 | 0.08 | 0.11 | 0.39 | 0.31 | 0.22 |
| Thickness (mils) | 115 | 104 | 121 | 122 | 100 | 107 | 125 |
| DSC Analysis | | | | | | | |
| Crystalline Transitions | | | | | | | |
| $T_{(i)}$ (°C.) | 163 | 169 | — | 163 | 161 | 164 | — |
| $T_{pk(f)}$ (°C.) | 186 | 187 | — | 187 | 185 | 186 | — |
| $\Delta H$ (j/g) | 14.4 | 17.2 | — | 13.1 | 18.7 | 19.9 | — |
| Glass Transitions | | | | | | | |
| $T_{g(i)}$ (°C.) | −59 | −62 | — | −58 | −58 | −62 | — |
| $T_{g(f)}$ (°C.) | −20 | −45 | — | −35 | −22 | −52 | — |
| $\Delta T$ (°C.) | 39 | 17 | — | 23 | 36 | 10 | — |

(Footnotes for TABLE I)
[1] 1,3-ex denotes a 1,3-extender-polyol of the present invention.
[2] Propylene oxide is polymerized in each of the three segments of polymer chain, whereas in the 1,3-extender polyols of this invention, propylene oxide is polymerized in only one segment.

As can be seen from these Examples, plaques made employing both a 15:85 wt. % and a 25:75 wt. % ratio of BDO chain extender: 1,3-extender polyol were satisfactory insofar as their physical properties.

These Examples also illustrate the improved flex modulus ratio of RIM polyurethane plaques made using 1,3-extender polyol (Example 9) are improved compared to a similar molecular weight polyol, i.e. Polyol I-based plaque. The relatively high H of the 1,3-extender polyol based plaques suggests the presence of more crystalline hard segments in the plaque, which is indicative of a cleaner phase separation of the hard and soft segments, while the relatively narrow T suggests a cleaner soft phase segment which is likewise indicative of a cleaner phase separation of the hard and soft segments. The cleaner phase separation should be beneficial in developing RIM polyurethanes having better impact characteristics.

EXAMPLES 15-17

These Examples parallel Examples 8-14 and illustrate the preparation of hand-cast polyurethane plaques prepared according to the procedure set forth above utilizing 1,2-extender polyols of the present invention. In Example 15, the 1,2-extender polyol prepared in Example 1 (which is a mixture of 1,2- and 1,3- isomers) was used to prepare hand-cast plaques, while in Example 16 the 1,2-extender polyol prepared in Example 2 was used. For comparative purposes, in Example 10, a plaque was made using Polyol I. In each Example, the chain extender was 1,4-butanediol (BDO); and the weight ratio of BDO-to-polyol was 15:85. The properties of the 1,2-extender polyols and Polyol I used to make the plaques, and the properties of the resulting hand-cast polyurethane plaques are set forth in Table II.

TABLE II

| Example No. | 15 | 16 | 17 |
|---|---|---|---|
| Polyol, type | Ex. 1 | Ex. 2 | I |
| mol. wt. | 2546 | 4372 | 4300 |
| unsat. (meq/g) | 0.002 | 0.01 | 0.084 |
| Ethylene oxide, wt. % | 9.0 | 9.0 | 14 |
| Propylene oxide (moles) | 42 | 72 | 72* |
| BDO:Polyol Ratio (wt. %) | 15:85 | 15:85 | 15:85 |
| Physical Properties | | | |
| Density (pcf) | 74 | 70.6 | 71.4 |
| Hardness (Shore D) | 54 | 44 | 45 |
| 100% Modulus (psi) | 2580 | 1740 | 1840 |
| Tensile Strength (psi) | 2900 | 2800 | 2800 |
| Ult. Elong. (%) | 140 | 218 | 190 |
| Die "C" Tear (psi) | 396 | 308 | 289 |
| Flex Modulus (psi) | | | |
| −29° C. | 95M | 38 | 36 |
| 24° C. | 17 | 16 | 12 |
| 70° C. | 16 | 11 | 8 |
| Flex Modulus Ratio | | | |
| −29° C./70° C. | 5.94 | 3.45 | 4.5 |
| Sag (in.) 1 hr., 121° C. | 0.03 | 0.14 | 0.11 |
| Thickness (mils) | 116 | 121 | 122 |
| DSC Analysis | | | |
| Crystalline Transitions | | | |
| $T_{(i)}$ (°C.) | — | 164.8 | 163 |
| $T_{pk(f)}$ (°C.) | — | 186.4 | 87 |
| $\Delta H(j/g)$ | — | 13.4 | 13.1 |
| Glass Transitions | | | |
| $T_{g(i)}$ (°C.) | — | −62 | −58 |
| $T_{g(f)}$ (°C.) | — | −50 | −35 |
| $\Delta T$ (°C.) | — | 12 | 23 |

(Footnotes for TABLE II)
*Propylene oxide is polymerized in each of the three segments of polymer chain, whereas in the 1,2-extender polyols of this invention propylene oxide is polymerized in only one segment.

It can be seen from Examples 16 and 17 that the physical properties of plaques prepared from the 1,2-extender polyol of Example 2 were similar to the physical properties of plaques prepared from Polyol I. The elongation and tear of the 1,2-extender polyol based plaques were somewhat higher, and thus better, than that of the Polyol I-based plaque. Importantly, however, the flex modulus ratio of the 1,2-extender polyol-based plaque showed an improvement over the flex modulus ratio of the Polyol I-based plaque. While there was only a slight improvement in H of crystallinity for the plaque prepared in Example 16 compared to the H of crystallinity of the plaque of Example 17, the Tg for the plaque of Example 16 was much sharper (i.e. lower number) than the Tg for the plaque of Example 17. The sharper Tg is indicative of a cleaner phase separation, similar to that observed with plaques made using 1,3-extender polyols.

It is postulated that the lower H values of the 1,2-extender polyol-based plaque of Example 16 compared to a comparable molecular weight 1,3-extender polyol-based plaque (Example 9) may be due to the different reactivity of hydroxyl groups on the two extenders. Thus, on the 1,3-extender polyol, all of the hydroxyl groups are potentially primary groups whereas with 1,2-extender polyols, at best only 66% of the hydroxyl groups are primary. Stated another way, in the 1,2-extender polyols, one of the extender hydroxyl groups will be a secondary group and slower to react than the primary groups.

Thus, it would appear, based on the data of Examples 8-17, that extender polyols of a nominal molecular weight of about 3000 to about 4800, may be preferred for use in RIM techniques for the preparation of nonstructural parts such as fascia for the automotive market.

EXAMPLES 18-28

These Examples illustrate the preparation of polyurethane polymers with an Admiral commercial RIM machine, using 1,3-extender polyol prepared in Example 6.

In each of the Examples, RIM polyurethane polymer was prepared from a polyol formulation comprised of BDO (1,4-butanediol) and polyol in the weight ratio of BDO-to-polyol of 22:78. The formulation further includes dibutyltin dilaurate catalyst and tolylene diisocyanate. The ratio of isocyanate-to-polyol (hereinafter NCO Index) was varied from 96 to 108 as noted in the Examples. In Examples 18-20, the 1,3-extender polyol of Example 6 was used, in Examples 21-24, Polyol II was used, and, in Examples 25-28, Polyol I was used. The processing conditions employed for each Example were as follows: The resin temperature was 90° F., and the isocyanate temperature was 75° F., both at 1800 psi. The mold temperature was 160° F. Polyurethane polymer plaques made at each NCO Index were demolded at 15 seconds and at one minute. The polymers were cured for one hour at 250° F.

The specific process formulations used in preparing the RIM polyurethane polymers of these Examples and the properties of the polymers at a demold time of one minute are set forth in Table III.

TABLE III

| Example No. | 18 | 19 | 20 | 21 | 22 | 23 | 24 | 25 | 26 | 27 | 28 |
|---|---|---|---|---|---|---|---|---|---|---|---|
| Formulation (wt. %) | | | | | | | | | | | |
| 1,3-extender polyol[1] | 78 | 78 | 78 | 78 | — | — | — | — | — | — | — |
| Polyol II | — | — | — | — | 78 | 78 | 78 | — | — | — | — |
| Polyol I | — | — | — | — | — | — | — | 78 | 78 | 78 | 78 |
| BDO | 22 | 22 | 22 | 22 | 22 | 22 | 22 | 22 | 22 | 22 | 22 |
| Tin catalyst | 0.10 | 0.10 | 0.10 | 0.10 | 0.15 | 0.15 | 0.15 | 0.10 | 0.10 | 0.10 | 0.10 |

TABLE III-continued

| Example No. | 18 | 19 | 20 | 21 | 22 | 23 | 24 | 25 | 26 | 27 | 28 |
|---|---|---|---|---|---|---|---|---|---|---|---|
| NCO Index | 96 | 100 | 104 | 108 | 100 | 104 | 108 | 96 | 100 | 104 | 108 |
| Physical Properties | | | | | | | | | | | |
| Density (pcf) | 62.6 | 63.4 | 63.0 | 61.0 | 62.1 | 58.5 | 62.3 | 62.6 | 61.2 | 63.1 | 63.2 |
| Hardness (Shore D) | 63 | 56 | 57 | 63 | 60 | 58 | 60 | 53 | 54 | 57 | 58 |
| 100% Modulus (psi) | 2210 | 2143 | 2236 | 2451 | 2035 | 1880 | 2045 | 1862 | 1952 | 2106 | 2274 |
| Tensile Strength (psi) | 2990 | 2970 | 2855 | 2950 | 2965 | 2690 | 2830 | 2760 | 2805 | 3080 | 3180 |
| Ult. Elong. (%) | 205 | 210 | 195 | 170 | 220 | 220 | 230 | 215 | 220 | 225 | 210 |
| Die "C" Tear (pli) | 595 | 555 | 555 | 595 | 540 | 480 | 570 | 635 | 575 | 620 | 645 |
| Flex Modulus (psi) | | | | | | | | | | | |
| −29° C. | 100 | 103 | 113 | 124 | 102 | 93.4 | 107 | 86.3 | 96.9 | 110 | 119 |
| 24° C. | 42.0 | 41.3 | 46.3 | 52.1 | 41.7 | 42.8 | 48.3 | 29.0 | 35.3 | 43.4 | 47.7 |
| 70° C. | 20.5 | 21.4 | 25.2 | 29.9 | 24.4 | 23.8 | 28.6 | 14.9 | 19.8 | 23.9 | 28.9 |
| Flex Modulus Ratio | | | | | | | | | | | |
| −29° C./70° C. | 4.9 | 4.8 | 4.5 | 4.1 | 4.2 | 3.9 | 3.7 | 5.8 | 4.9 | 4.6 | 4.0 |
| Sag (in.) 1 hr., 121° C. | 0.15 | 0.20 | 0.15 | 0.10 | 0.20 | 0.15 | 0.15 | 0.25 | 0.05 | 0.10 | 0.10 |
| DSC Analysis | | | | | | | | | | | |
| Crystalline Transitions | | | | | | | | | | | |
| $T_{(i)}$ (°C.) | 166.4 | 172.3 | 171.5 | 175.8 | 166.9 | 165.4 | 163.6 | 165.2 | 169.3 | 173.1 | 175.1 |
| $T_{pk(f)}$ (°C.) | 185.93 | 189.56 | 188.82 | 193.14 | 185.75 | 184.40 | 187.61 | 189.28 | 192.15 | 191.00 | 193.97 |
| ΔH(j/g) | 19.7 | 14.3 | 16.3 | 16.5 | 13.0 | 10.7 | 14.8 | 17.7 | 17.2 | 18.2 | 22.7 |
| Glass Transitions | | | | | | | | | | | |
| $T_{g(i)}$ (°C.) | −63 | −63 | −60 | −65 | −60 | −64 | −62 | −60 | −60 | −60 | −60 |
| $T_{g(f)}$ (°C.) | −45.6 | −45.6 | −44 | −48.8 | −45 | −56 | −48 | −52 | −45 | −46 | −40 |
| ΔCp (J/g/kg) | 0.174 | 0.115 | 0.180 | 0.203 | −0.0611 | −0.0108 | −0.000275 | 0.0435 | 0.0684 | 0.178 | 0.154 |

[1]The 1,3-extender polyol prepared in Example 6 was used.

Flows, cracking and flash characteristics of the polymer molds of these Examples were evaluated. It was found with respect to the polymers prepared with 1,3-extender polyols (Examples 18–20) that the physical properties of these molds were all within commercial specifications and likewise that the properties paralleled the favorable properties obtained with hand-cast plaques made with like polyol formulations. Further, flash removal from these molds upon demolding were found to be very good; and flow characteristics were found to be excellent.

The gel times of polyols having similar hydroxyl numbers, i.e., 1,3-extender polyol, OH#38.8 and Polyol I, OH#35.5, were observed to be comparable, 6.7 seconds and 6.5 seconds, respectively, whereas the gel time of Polyol II, OH#29.5, was longer (8.5 seconds).

Thus, the novel extender polyols of the present invention can be used satisfactorily in low modulus BDO, RIM applications, to provide polyurethane polymer molds having physical properties comparable to conventional polyols. Stated another way, there is no penalty in terms of the physical properties of the polyurethane polymer when the novel extender polyols of this invention are used in low modulus BDO, RIM applications.

As noted above, all of the plaques of Examples 18–28 were demolded at 15 seconds. However, only the plaques of Examples 18, 19, 20, 24 and 25 had satisfactory surface properties at that demold time. The physical properties of these plaques at a 15 second demold time are set forth in Table IV.

TABLE IV

| Plaque of Example No. | 18 | 19 | 20 | 24 | 25 |
|---|---|---|---|---|---|
| NCO Index | 96 | 100 | 104 | 108 | 96 |
| Physical Properties | | | | | |
| Density, pcf | 62.6 | 63.4 | 63.2 | 62.3 | 62.6 |
| Hardness, Shore D | 63.0 | 56.0 | 58.0 | 60.0 | 53.0 |
| Ultimate tensile strength, psi | 2990 | 2970 | 2860 | 2830 | 2760 |
| 100% Modulus (psi) | 2210 | 2143 | 2250 | 2045 | 1862 |
| U.H. Elong (%) | 205 | 210 | 200 | 230 | 215 |
| Die "C" tear (psi) | 595 | 555 | 555 | 570 | 635 |
| Flexural modulus (Mpsi) | | | | | |

TABLE IV-continued

| Plaque of Example No. | 18 | 19 | 20 | 24 | 25 |
|---|---|---|---|---|---|
| −20° F. | 100 | 103 | 113 | 107 | 86.3 |
| +75° F. | 42 | 41.3 | 47.0 | 48.3 | 29.0 |
| +158° F. | 20.5 | 21.4 | 24.5 | 28.6 | 14.9 |
| Flex Modulus Ratio (−20/158) | 4.9 | 4.8 | 4.6 | 3.7 | 5.8 |
| Sag, 1 hr. at 250° F. (in.) | 0.15 | 0.20 | 0.15 | 0.15 | 0.25 |
| Thickness (mil) | (129) | (127) | (128) | (126) | (126) |
| DSC Analysis | | | | | |
| H (j/g) | 19.7 | 14.3 | 16.3 | 14.8 | 17.7 |

Molds made using Polyol II at NCO Indices of 100 and 104 and molds made using Polyol I at NCO Indices of 100, 104 and 108 all had unsatisfactory surface properties at 15 second demold time. On the other hand, at 15 second demold time, molds made using the 1,3-extender polyol formulation were found to have satisfactory surface properties over the entire NCO Index range, 96–104, that was used in these Examples. Only at NCO Index of 108 did the polymers have unsatisfactory surface characteristics at 15 seconds demold time.

Thus, RIM polyurethane polymers made using the novel extender polyols of the present invention are less sensitive to demolding time and to NCO Index than conventional polyols.

It was further observed that processing for the extender polyols are similar to both Polyol I and Polyol II, except the RIM plaques made using Polyol I are much softer immediately after demolding and that, upon standing and/or curing, the Polyol I and Polyol II-based RIM plaques are slightly more rigid than extender polyol-based RIM plaques. However, there did not appear to be an appreciable change in physical flexural appearance between demold and cured plaque for extender polyol-based plaques.

EXAMPLES 29–49

These Examples illustrate the stabilization efficiency of extender polyols with ethylene glycol using a 1,3-extender polyol of molecular weight 4574 (as prepared in Example 6). This polyol is capped with only 7 wt % ethylene oxide. Comparisons of the 1,3-extender polyol were made with Polyols I and III and with other stabilizing agents, identified herein including 3-butoxyethoxy-1,2-propanediol. (Referred to herein as Stabilizer I).

In Examples 29–31, the solubility of ethylene glycol in 1,3-extender polyol, Polyol I and Polyol III was determined by placing 50 ml of polyol in a 100 ml Erlenmeyer flask, adjusting the temperature to 25° C. and adding ethylene glycol in 0.5 ml increments with gentle swirling. Insolubility was taken as the point where a slight haze was observed. The solubility of ethylene glycols at 25° C. is illustrated in Table V:

TABLE V

| Example | Polyol | Wt % EG[1] |
|---|---|---|
| 29 | Polyol III | 13.8 |
| 32 | Polyol I | 6.0 |
| 31 | 1,3-extender polyol | 5.0 |

[1]EG denotes ethylene glycol

The results confirm the prediction that ethylene glycol is less soluble in lower ethylene oxide-containing polyols such as the 1,3-extender polyol and Polyol I than it is in higher ethylene oxide-containing polyols, such as Polyol III.

In Examples 32–40, the stability of 20 wt % and 40 wt % ethylene glycol/polyol emulsions was determined by preparing ethylene glycol emulsions with 1,3-extender polyol of molecular weight 4754 (Example 6), Polyol I and Polyol III. The emulsions were prepared by heating a mixture of ethylene glycol and polyol to 100° C., gently shaking the mixture, and placing it in a constant temperature water bath set at the temperature indicated in Table VI. The time for phase separation was determined when a clear droplet was observed on the bottom of the flask.

The emulsion compositions, temperature, phase separation and relative stability of the emulsions is set forth in Table VI:

TABLE VI

| Example | Polyol Compound | EG (wt %) | Temp. °C. | Phase Separation (Hours) | Relative Stability |
|---|---|---|---|---|---|
| 32 | 1,3-extender polyol | 40 | 80 | 15 | 300 |
| 33 | Polyol III | 40 | 80 | 0.07 | 1.4 |
| 34 | Polyol I | 40 | 80 | 0.05 | 1.0 |
| 35 | 1,3-extender polyol | 20 | 80 | 24 | 12 |
| 36 | Polyol III | 20 | 80 | 2.5 | 1.3 |
| 37 | Polyol I | 20 | 80 | 2.0 | 1.0 |
| 38 | 1,3-extender polyol | 20 | 25 | 18 | — |
| 39 | Polyol III | 20 | 25 | 18 | — |
| 40 | Polyol I | 20 | 25 | 18 | — |

It can be seen from these Examples that the 1,3-extender polyol is an extremely effective stabilizer for ethylene glycol even at high concentrations of ethylene glycol. Moreover, ethylene glycol/polyol emulsions stabilized with 1,3-extender polyol were unexpectedly much more stable than ethylene glycol/polyol emulsions stabilized with the high ethylene oxide containing Polyol III.

In Examples 41–49, emulsions of Polyol I and ethylene glycol were stabilized with three different stabilizers—viz. 1,3-extender polyol of molecular weight 4754, Stabilizer I which is an extender-like material, and Polyol III—in order to determine the effect of the extender-like segment and the long chain polypropylene glycol segment on stabilization.

The stabilizing agent, emulsion composition, temperature and phase separation data for the stabilized emulsions are set forth in Table VII:

TABLE VII

| Example | Stabilizing Agent (2 wt %) | Polyol Compound | EG (wt %) | Temp. °C. | Phase Separation (Hours) | Relative Stability |
|---|---|---|---|---|---|---|
| 41 | 1,3-extender polyol | Polyol I | 40 | 80 | 3 | 43 |
| 42 | Stabilizer I | Polyol I | 40 | 80 | 0.25 | 3.6 |
| 43 | Polyol III | Polyol I | 40 | 80 | 0.07 | 1.0 |
| 44 | 1,3-extender polyol | Polyol I | 20 | 80 | 24 | 12 |
| 45 | Stabilizer I | Polyol I | 20 | 80 | 2.0 | 1.0 |
| 46 | Polyol III | Polyol I | 20 | 80 | 2.0 | 1.0 |
| 47 | 1,3-extender polyol | Polyol I | 20 | 25 | 18 Stable | — |
| 48 | Stabilizer I | Polyol I | 20 | 25 | 18 Partial | — |
| 49 | Polyol III | Polyol I | 20 | 25 | 18 Complete | — |

As can be seen from these Examples, the 1,3-extender polyols provide signficantly better stabilization than either Stabilizer I or Polyol III, while Stabilizer I provides for a slightly improved stability over Polyol III. Based on this data, it is believed that both the extender segment and the long chain polypropylene oxide segment of the extender polyols of this invention contribute to the improved ethylene glycol emulsion stabilization observed with such polyols.

EXAMPLES 50–64

These Examples illustrate the preparation of 58 percent hard segment polyurethane RIM polymers using 1,3-extender polyol of molecular weight 4754 (Example 6) with ethylene glycol on an Admiral RIM machine (Examples 50–61). For comparative purposes, Polyol IV was used in place of the 1,3-extender polyol, at the NCO Index indicated (Examples 62–64).

The specific formulation and process parameters, and the physical properties of the plaques produced are set forth in Table VIII:

TABLE VIII

| Ex. No. | 50 | 51 | 52 | 53 | 54 | 55 | 56 | 57 |
|---|---|---|---|---|---|---|---|---|
| Formulation | | | | | | | | |
| Polyol IV | | | | | | | | |
| 1,3 extender-polyol | 79.75 | 79.75 | 79.75 | 79.75 | 79.75 | 79.75 | 79.75 | 79.75 |
| Ethylene glycol | 20.25 | 20.25 | 20.25 | 20.25 | 20.25 | 20.25 | 20.25 | 20.25 |
| Dibutyltin-dilaurate[1] | 0.12 | 0.12 | 0.12 | 0.12 | 0.12 | 0.12 | 0.12 | 0.12 |
| MDI | 107.1 | 107.1 | 107.1 | 107.1 | 107.1 | 107.1 | 107.1 | 107.1 |
| NCO Index | 105 | 105 | 105 | 105 | 105 | 105 | 105 | 105 |
| Processing Conditions | | | | | | | | |
| Resin temp., °F. | 130 | 130 | 130 | 130 | 130 | 130 | 130 | 130 |

TABLE VIII-continued

| | | | | | | | | |
|---|---|---|---|---|---|---|---|---|
| Isocyanate temp., °F. | 75 | 75 | 75 | 75 | 75 | 75 | 75 | 75 |
| Mold temp., °F. | 180 | 160 | 140 | 130 | 120 | 120 | 120 | 112 |
| Demold time, sec. | 60 | 60 | 60 | 60 | 60 | 30 | (15) | 60 |
| Resin pressure, psig | 1800 | 1800 | 1800 | 1800 | 1800 | 1800 | 1800 | 1800 |
| Isocyanate pres., psig | 1800 | 1800 | 1800 | 1800 | 1800 | 1800 | 1800 | 1800 |
| Post-cure time at 250° F., hr. | 1 | 1 | 1 | 1 | 1 | 1 | 1 | 1 |
| Physical Properties | | | | | | | | |
| Density, pcf | 65.1 | 64.2 | 65.2 | 65.2 | 65.0 | 65.5 | 63.3 | 62.6 |
| Tensile streng., psi at 100% elong. | 3522 | 3567 | 3507 | 3486 | 3445 | 3523 | 3421 | 3419[2] |
| ultimate | 3698 | 3806 | 3689 | 3840 | 3757 | 3806 | 3724 | 3561[2] |
| Elongation, % | 110 | 123 | 113 | 130 | 127 | 125 | 122 | 110[2] |
| Shore D hardness | 65 | 65 | 65 | 67 | 66 | 68 | 69 | 68 |
| Die "C" tear strength, pli | 502 | 467 | 466 | 492 | 520 | 479 | 510 | 495 |
| Flex. modulus, Mpsi | | | | | | | | |
| −20° F. | 137.4 | 120.8 | 128.1 | 140.5 | 134.5 | 150.2 | 147.5 | 137.2 |
| 75° F. | 58.8 | 54.8 | 58.7 | 58.4 | 58.3 | 61.3 | 61.3 | 57.4 |
| 158° F. | 34.8 | 34.2 | 36.6 | 35.9 | 34.9 | 37.1 | 36.7 | 35.2 |
| Flex. mod. multiple | 3.9 | 3.5 | 3.5 | 3.9 | 3.9 | 4.0 | 4.0 | 3.9 |
| Heat sag at 250° F., in. | 0.04 | 0.11 | 0.05 | 0.07 | 0.08 | 0.04 | 0.05 | 0.04 |
| at (thickness, in.) | (0.153) | (0.154) | (0.153) | (0.154) | (0.154) | (0.154) | (0.157) | (0.158) |

| Ex. No. | 58 | 59 | 60 | 61 | 62 | 63 | 64[3] |
|---|---|---|---|---|---|---|---|
| Formulation | | | | | | | |
| Polyol IV | — | — | — | — | 80.05 | 80.05 | 80.05 |
| 1,3 extender-polyol | 79.75 | 79.75 | 79.75 | 79.75 | — | — | — |
| Ethylene glycol | 20.25 | 20.25 | 20.25 | 20.25 | 19.95 | 19.95 | 19.95 |
| Dibutyltin-dilaurate[0.12] | 1 | 0.12 | 0.12 | 0.12 | 0.12 | 0.12 | 0.12 |
| MDI | 107.5 | 105.3 | 96.3 | 96.3 | 96.3 | 107.5 | — |
| NCO Index | 110 | 105 | 103 | 95 | 95 | 95 | 104 |
| Processing Conditions | | | | | | | |
| Resin temp., °F. | 130 | 130 | 130 | 130 | 130 | 130 | 130 |
| Isocyanate temp., °F. | 75 | 75 | 75 | 75 | 75 | 75 | 75 |
| Mold temp., °F. | 160 | 160 | 160 | 160 | 180 | 120 | 160 |
| Demold time, sec. | 60 | 60 | 60 | 60 | 60 | 60 | 60 |
| Resin pressure, psig | 1800 | 1800 | 1800 | 1800 | 1800 | 1800 | 1800 |
| Isocyanate pres., psig | 1800 | 1800 | 1800 | 1800 | 1800 | 1800 | 1800 |
| Post-cure time at 250° F., | 1 | 1 | 1 | 1 | 1 | 1 | 1 |
| Physical Properties | | | | | | | |
| Density, pcf | 62.4 | 62.1 | 62.7 | 62.5 | 64.4 | 62.7 | 62.0 |
| Tensile streng., psi at 100% elong. | 3226 | 3135 | 3154 | 3020 | 2759 | 2789 | — |
| ultimate | 3513 | 3546 | 3647 | 3364 | 3401 | 3399 | 3620 |
| Elongation, % | 125 | 138 | 143 | 122 | 158 | 162 | 148 |
| Shore D hardness | 65 | 61 | 58 | 60 | 60 | 64 | — |
| Die "C" tear strength, pli | 496 | 455 | 422 | 379 | 406 | 455 | 525 |
| Flex. modulus, Mpsi | | | | | | | |
| −20° F. | 138.9 | 120.1 | 125.3 | 96.0 | 95.1 | 105.4 | — |
| 75° F. | 59.4 | 52.0 | 50.8 | 37.0 | 44.0 | 48.6 | 55.0 |
| 158° F. | 34.2 | 30.0 | 30.0 | 22.6 | 28.3 | 28.3 | — |
| Flex. mod. multiple | 4.1 | 4.0 | 4.2 | 4.2 | 3.4 | 3.7 | — |
| Heat sag at 250° F., in. | 0.11 | 0.10 | 0.12 | 0.12 | 0.03 | 0.06 | 0.09 |
| at (thickness, in.) | (0.155) | (0.155) | (0.153) | (0.154) | (0.153) | (0.157) | (0.157) |

[1]Amount is parts per hundred of total mix.
[2]Average of two best, all others average of three.

The 1,3-extender polyol-based high hard segment formulations processed well and possessed satisfactory green strength over the entire NCO Index range of 95–110. At typical mold temperatures, i.e. 160°–180° F., the physical properties, and particularly surface cracking of the plaques made from 1,3-extender polyol formulations, were likewise satisfactory. Even at mold temperatures down to about 120° F., plaques made using 1,3-extender polyol formulations appeared to be less sensitive to surface cracking in contrast to conventional polyol-based formulations, i.e., Polyol II, where surface delamination occurred at mold temperatures of 140 and below. Further, the severity of cracking of the 1,3-extender polyol-based plaques was relatively insensitive to the NCO Index or stoichiometry of the polymer formation reaction. It was also observed that the surface characteristics of plaques demolded at 15 seconds were not appreciably different than the surface characteristics of plaques demolded at 60 seconds. Thus, 1,3-extender polyol-based plaques are capable of being easily processed over both a broad range of temperatures, a broad NCO Index and broad range of demolding time without any adverse effect on the physical properties, and particularly surface cracking, of the plaque.

It was further observed that the 1,3-extender polyol formed a much more stable resin with ethylene glycol than is typical of low ethylene oxide-capped polyols. By visual inspection, no separation of components was observed three days after the formulation had been prepared whereas, even with higher ethylene oxide-containing polyols (e.g., 50 wt % ethylene oxide), obvious separation typically occurs within 24 hours.

Thus, in RIM applications, the polyols of this invention may be considered to be friendly polyols in that use of such polyols tends to be foregiving, allowing substantially more latitude and requiring less exactness in the various molding process parameters. On the contrary, as indicated in Table VIII commercial polyols, such as Polyol II, were not found to be as forgiving in that RIM plaques having satisfactory surface characteristics at demolding could not be consistently produced for these process conditions.

EXAMPLES 65-70

Examples 65 and 68 illustrate the preparation of high resiliency molded foams using a blend of 1,3-extender polyol as the base polyol and polymer/polyol A in a weight ratio of base polyol-to-polymer/polyol of 70-to-30. For comparative purposes, foams were made using Polyol V (Examples 66 and 69) and Polyol VI (Examples 67 and 70).

The molded foams were prepared according to the procedure set forth above. The lower density foams (Examples 65-67) were prepared using eight parts by weight fluorocarbon blowing agent, while the higher density foams (Examples 68-70) were prepared without the use of a fluorocarbon blowing agent.

The process conditions and properties of the resulting foams are set forth in Table IX:

TABLE IX

| Example No. | 65 | 66 | 67 | 68 | 69 | 70 |
|---|---|---|---|---|---|---|
| Process Condition | | | | | | |
| 75/25 TDI/MRS | 39.9 | 39.5 | 38.6 | 39.9 | 39.5 | 38.6 |
| NCO Index | 103 | 103 | 103 | 103 | 103 | 103 |
| Exit Time, secs. | 50 | 51 | 58 | 52 | 51 | 57 |
| Pad Weight, gms. | 544 | 551 | 517 | 685 | 691 | 661 |
| Foam Properties | | | | | | |
| Density, lb/ft$^3$ | 1.85 | 1.85 | 1.73 | 2.22 | 2.29 | 2.13 |
| Resiliency, % ball rebound | 63 | 63 | 66 | 67 | 66 | 69 |
| Porosity, ft$^3$/min/ft$^2$ | 59 | 34 | 64 | 55 | 32 | 70 |
| ILD, lb/50 in$^2$ | | | | | | |
| 25% | 14.5 | 16.9 | 12.7 | 25.1 | 27.5 | 25.0 |
| 50% | 27.6 | 31.5 | 26.1 | 44.5 | 49.5 | 44.8 |
| ILD Ratio | 1.90 | 1.86 | 2.06 | 1.77 | 1.80 | 1.79 |
| Tensile Strength, lb/in$^2$ | 13.2 | 13.5 | 15.1 | 18.6 | 22.2 | 22.0 |
| Elongation, % | 143 | 130 | 179 | 146 | 156 | 184 |
| Tear Resistance, lb/in | 1.41 | 1.66 | 2.24 | 1.60 | 1.80 | 2.25 |
| 75% Compression Set, % | 10.1 | 12.8 | 12.4 | 8.1 | 9.8 | 8.6 |
| Humid Aging (5 hr. at 120° C.) | | | | | | |
| 50% Compression Set, % | 27.4 | 27.7 | 32.9 | 18.8 | 20.8 | 24.7 |
| 50% CLD Load Loss, % | 17.0 | 19.2 | 9.5 | 17.1 | 24.5 | 10.6 |

As can be seen from these Examples, use of the 1,3-extender polyols in the preparation of high resiliency molded foams produces foams with acceptable physical properties.

It can further be seen that the reactivity of the polyols of this invention is similar to the reactivity of conventional polyols having a similar hydroxyl number (e.g., Polyol V), yet the physical properties of foams prepared using these polyols are more similar to the physical properties of foams prepared using conventional polyols having a lower hydroxyl number (e.g., Polyol VI). Stated another way, the polyols of this invention have a high hydroxyl number desirable with respect to reactivity, but the end-to-end distances of the hydroxyl groups more closely approximates such distances in commercial polyols of lower hydroxyl number, which provides desirable elasticity characteristics and the like.

EXAMPLE 71

This Example illustrates the preparation of a 16 wt.% acrylonitrile polymer/polyol using the 1,3-extender polyol of Example 6. The polymer/polyol was prepared by reacting at 120° C. for two hours, 198 gm polyol of Example 6 with 88 gm acrylonitrile in the presence of 18 gm VAZO-64 catalyst and then feeding to the reaction vessel a post feed (at 120° C. for one hour) comprising 33 gm polyol of Example 6 and 0.44 gm VAZO-64. The resulting polymer/polyol had a viscosity, at 25° C., of 2000 cps, a nominal hydroxyl number of 32.6, filterability (150 mesh), 100% through, and centrifugible solids of 2.0%.

What is claimed is:

1. A normally liquid, stable polymer/polyol composition formed by polymerizing in the presence of a free radical catalyst, (1) from about 10 to about 50 weight percent of at least one ethylenically unsaturated monomer dissolved or dispersed in (2) from about 50 to about 90 weight percent of a polyol having the general formula:

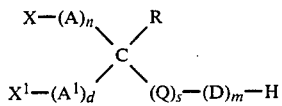

wherein A and A$^1$ are individually connective atoms which may be the same or different and are selected from the group consisting of carbon and oxygen or combinations thereof; C is a carbon atom; Q is a member selected from the group consisting of O, CH$_2$O, C$_2$H$_4$O, C$_3$H$_6$O and C$_4$H$_8$O; D is a member selected from the group consisting of,

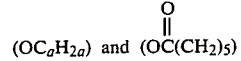

where a has a value of one to four; H is hydrogen; R is selected from the group consisting of hydrogen, alkyl and aryl; X and X$^1$ may be the same or different and are individually selected from the group consisting of OH, NHR and H, X and X$^1$ being selected such that the combination of X and X$^1$ and their respective adjacent atomic units A and A$^1$ provide a functional group reactive with an isocyanate radical; n and d are individually intergers of 0 to 10 of which the sum of n and d is at least 1 and does not exceed 10; s is either 0 or 1; and m is an integer of at least about 16.

2. The polymer/polyol of claim 1. wherein Q is a member selected from the group consisting of CH$_2$O—, C$_2$H$_4$O—, C$_3$H$_6$O— and C$_4$H$_8$O.

3. The polymer/polyol composition of claim 1 wherein X and X' are OH.

4. The polymer/polyol composition of claim 3 wherein D is OC$_a$H$_{2a}$.

5. The polymer/polyol composition of claim 4 wherein a equals 3.

6. The polymer/polyol composition of claim 5 wherein the sum of n and d is 2.

7. The polymer/polyol composition of claim 6 wherein said oxypropylene is capped with ethylene oxide.

8. The polymer/polyol composition of claim 5 wherein said polyol has a hydroxyl number of from about 30 to about 75.

9. The polymer/polyol composition of claim 5 wherein m is at least about 35.

10. The polymer/polyol composition of claim 1 wherein R is $C_2H_5$, A and A' are $CH_2$, X and X' are OH, Q is $CH_2O$— and n and d are each 1.

11. The polymer/polyol composition of claim 10 wherein D is $OC_aH_{2a}$.

12. The polymer/polyol composition of claim 11 wherein m is at least about 35.

* * * * *